US006658002B1

United States Patent
Ross et al.

(10) Patent No.: US 6,658,002 B1
(45) Date of Patent: Dec. 2, 2003

(54) LOGICAL OPERATION UNIT FOR PACKET PROCESSING

(75) Inventors: Mark A. Ross, San Carlos, CA (US); Sun-Den Chen, San Jose, CA (US); Andreas V. Bechtolsheim, Incline Village, NV (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/335,800

(22) Filed: Jun. 17, 1999

Related U.S. Application Data

(63) Continuation-in-part of application No. 09/108,071, filed on Jun. 30, 1998, now Pat. No. 6,377,577.

(51) Int. Cl.⁷ .............................................. H04L 12/56

(52) U.S. Cl. ..................................................... 370/392

(58) Field of Search ................................ 370/232, 466, 370/392–395, 389, 401–402, 403; 709/5, 11, 224, 220, 245, 246–248

(56) References Cited

U.S. PATENT DOCUMENTS

| | | | |
|---|---|---|---|
| 3,648,254 A | | 3/1972 | Beausoleil |
| 4,296,475 A | | 10/1981 | Nederlof et al. |
| 4,791,606 A | | 12/1988 | Threewitt et al. |
| 4,996,666 A | | 2/1991 | Duluk, Jr. |
| 5,088,032 A | | 2/1992 | Bosack |
| 5,283,882 A | * | 2/1994 | Smith et al. ................... 365/49 |
| 5,319,763 A | | 6/1994 | Ho et al. |
| 5,383,146 A | | 1/1995 | Threewitt |
| 5,440,715 A | | 8/1995 | Wyland |
| 5,450,351 A | | 9/1995 | Heddes |

(List continued on next page.)

OTHER PUBLICATIONS

Jon P. Wade and Charles G. Sodini, "A Ternary Content Addressable Search Engine," IEEE Journal of Solid–State Circuits, vol. 24, No. 4, Aug. 1989, pp. 1003–1013.

Teuvo Kohonen, content–Addessable Memories, 1987, pp. 128–129 and 142–144, Springer–Verlang, New York.

Brian Dipert, ed., "Special–purpose SRAMs Smooth the Ride," EDN, Jun. 24, 1999, pp. 93–104.

(List continued on next page.)

*Primary Examiner*—Chi Pham
*Assistant Examiner*—Thai Hoang
(74) *Attorney, Agent, or Firm*—The Law Office of Kirk D. Williams

(57) ABSTRACT

An apparatus and method for performing logical operations on information in the communications protocol stack, such as the transport layer (L4) port numbers, characterizing a received packet or frame of data in a data communications device such as a router or switch. The results of the logical operations, along with other packet/frame-identifying data, are used to generate a more efficient lookup key. A content addressable memory (CAM) lookup is used to determine the action indicated by the rules defined by a rule-based routing or switching scheme, such as an access control list (ACL). The results of these logical operations extend the key space and thus provide a finer-grained match between the original, unextended input key and a rule action, thereby pointing to a rule action precisely tailored to packet processing. The rule can thus be applied with fewer CAM entries, providing the versatility improvement and CAM cost reduction necessary to keep up with the ever-increasing rule complexity requirements of advanced data communication and internetworking systems. An embodiment utilizing asymmetrical processing of packets, depending on whether the packet is inbound to the data communications device or outbound from it, is also disclosed. Furthermore, a ternary content-addressable memory (TCAM) implementation is disclosed. Use of a TCAM for ACL or other rule lookups further enhances the efficiency of rule processing by providing a masking capability for each TCAM entry which can be used to provide an additional level of flexibility for rule element checking.

37 Claims, 16 Drawing Sheets

U.S. PATENT DOCUMENTS

| | | | |
|---|---|---|---|
| 5,481,540 A | | 1/1996 | Huang |
| 5,515,370 A | | 5/1996 | Rau |
| 5,537,623 A | * | 7/1996 | Chamberlain et al. ...... 709/220 |
| 5,740,171 A | | 4/1998 | Mazzola et al. ............ 370/392 |
| 5,745,780 A | * | 4/1998 | Phillip et al. .................. 712/23 |
| 5,841,874 A | | 11/1998 | Kempke et al. |
| 5,842,040 A | | 11/1998 | Hughes et al. |
| 5,898,689 A | * | 4/1999 | Kumar et al. ............... 370/232 |
| 5,920,886 A | | 7/1999 | Feldmeier |
| 5,930,359 A | | 7/1999 | Kempke et al. |
| 5,956,336 A | | 9/1999 | Loschke et al. |
| 5,978,885 A | | 11/1999 | Clark, II |
| 6,000,008 A | | 12/1999 | Simcoe |
| 6,041,389 A | | 3/2000 | Rao |
| 6,047,369 A | | 4/2000 | Colwell et al. |
| 6,061,368 A | | 5/2000 | Hitzelberger |
| 6,069,573 A | | 5/2000 | Clark, II et al. |
| 6,081,440 A | | 6/2000 | Washburn et al. |
| 6,091,725 A | | 7/2000 | Cheriton et al. |
| 6,097,724 A | | 8/2000 | Kartalopoulos |
| 6,134,135 A | | 10/2000 | Andersson |
| 6,137,707 A | | 10/2000 | Srinivasan et al. |
| 6,141,738 A | | 10/2000 | Munter et al. |
| 6,148,364 A | | 11/2000 | Srinivasan et al. |
| 6,154,384 A | | 11/2000 | Nataraj et al. |
| 6,175,513 B1 | | 1/2001 | Khanna |
| 6,181,698 B1 | | 1/2001 | Hariguchi |
| 6,199,140 B1 | | 3/2001 | Srinivasan et al. |
| 6,236,658 B1 | | 5/2001 | Essbaum et al. |
| 6,237,061 B1 | | 5/2001 | Srinivasan et al. |
| 6,240,003 B1 | | 5/2001 | McElroy |
| 6,243,667 B1 | | 6/2001 | Kerr et al. |
| 6,246,601 B1 | | 6/2001 | Pereira |
| 6,289,414 B1 | * | 9/2001 | Feldmeier et al. .......... 711/108 |
| 6,295,576 B1 | | 9/2001 | Ogura et al. |
| 6,304,903 B1 | * | 10/2001 | Ward .......................... 709/224 |
| 6,307,855 B1 | | 10/2001 | Hariguchi |
| 6,377,577 B1 | * | 4/2002 | Bechtolsheim et al. ..... 370/392 |
| 6,377,998 B2 | | 4/2002 | Noll et al. |

OTHER PUBLICATIONS

"Extending the LANCAM Comparand," Application Brief AB–N3, Rev. 1.0a Draft, Musci Semiconductors, Milpitas, CA, Sep. 30, 1998, 4 pages.

"Advantages of CAM in ASIC–Based Network Address Processing," Application Brief AB–N11, Rev. 1.2a Draft, Music Semiconductors, Milpitas, CA, Sep. 30, 1998, 4 pages.

"Virtual Memory Applications of the MU9C1480A LAN-CAM," Application Note AN–N3, Rev. 1a, Music Semiconductors, Milpitas, CA, Sep. 30, 1998, 12 pages.

"Using the MU9C1965A LANCAM MP for Data Wider than 128 Bits," Application Note AN–N19, Rev. 1a, Music Semiconductors, Milpitas, CA, Sep. 30, 1998, 16 pages.

"Fast IPv4 and IPv4 CIDR Address Translation and Filtering Using the MUAC Routing CoProcessor (RCP)," Application Note AN–N25, Rev. 0a, Music Semiconductors, Milpitas, CA, Oct. 1, 1998, 16 pages.

"Using MUSIC Devices and RCPs for IP Flow Recognition," Application Note AN–N27, Rev. 0, Music Semiconductors, Milpitas, CA, Oct. 21, 1998, 20 pages.

"Wide Ternary Searches Using Music CAMs and RCPs," Application Note AN–N31, Rev. 0, Music Semiconductors, Milpitas CA, Apr. 13, 1999, 8 pages.

R. Sangireddy, A. K. Somani; "Binary Decision Diagrams for Efficient Hardware Implementation of Fast IP Routing Lookups"; IEEE, Tenth International Conference on Computer Communications and Networks, Oct. 15–17, 2001, pp 12–17.*

D.G. Waddington and F. Chang; "Realizing the Transition to IPv6"; Communications Magazine, IEEE vol. 40, Issue 6, Jun. 2002, pp. 138–147.*

I. Y. Hsiao; C. W. Jen; "A new Hardware Design and FPGA Implementation for Internet Routing towards IP over WDM and Terabit Routers"; IEEE International Symposium on Circuits and Systems 2000, ISCAS 2000 Geneva May 28–31, 2000; vol. 1, pp. 387–390.*

* cited by examiner

FIG. 4

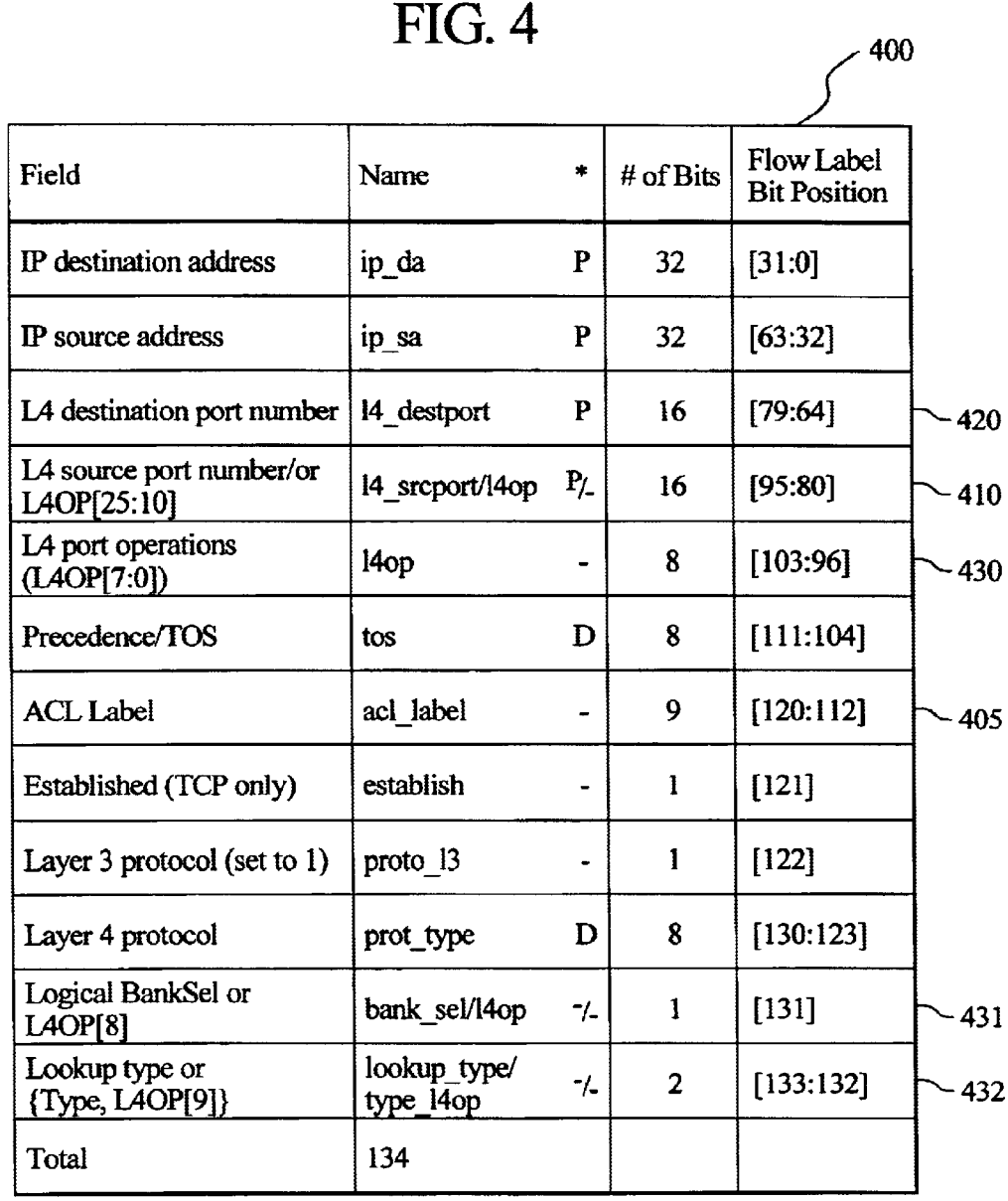

| Field | Name | * | # of Bits | Flow Label Bit Position | |
|---|---|---|---|---|---|
| IP destination address | ip_da | P | 32 | [31:0] | |
| IP source address | ip_sa | P | 32 | [63:32] | |
| L4 destination port number | l4_destport | P | 16 | [79:64] | ~420 |
| L4 source port number/or L4OP[25:10] | l4_srcport/l4op | P/- | 16 | [95:80] | ~410 |
| L4 port operations (L4OP[7:0]) | l4op | - | 8 | [103:96] | ~430 |
| Precedence/TOS | tos | D | 8 | [111:104] | |
| ACL Label | acl_label | - | 9 | [120:112] | ~405 |
| Established (TCP only) | establish | - | 1 | [121] | |
| Layer 3 protocol (set to 1) | proto_l3 | - | 1 | [122] | |
| Layer 4 protocol | prot_type | D | 8 | [130:123] | |
| Logical BankSel or L4OP[8] | bank_sel/l4op | -/- | 1 | [131] | ~431 |
| Lookup type or {Type, L4OP[9]} | lookup_type/ type_l4op | -/- | 2 | [133:132] | ~432 |
| Total | 134 | | | | |

\* D = DBUS Header; P = Packet Header

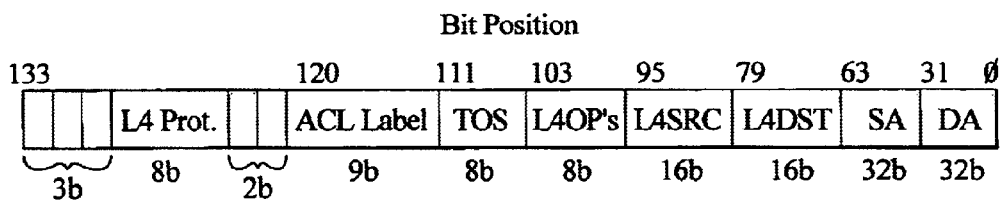

LOGICAL OPERATION UNIT FOR PACKET PROCESSING

CROSS-REFERENCE TO RELATED APPLICATIONS

This is a continuation-in-part of application Ser. No. 09/108,071, filed Jun. 30, 1998, now U.S. Pat. No. 6,377,577.

BACKGROUND OF THE INVENTION

1. Field of the Invention

The present invention generally concerns data communications systems, in particular internetworking systems and specifically access control techniques for such systems.

2. Description of the Related Art

Introduction

The data communications field encompasses a wide range of technologies, but systems for connecting networks of computers to other networks, known generally as internetworking, are of increasing importance. As these networks of networks (e.g., the Internet) proliferate, increasing attention is required to the problem of maintaining network security. In particular, access control at the data packet level has become a concern. Also known as packet filtering, packet-level access control is a technique whereby individual data packets in the communications data stream are examined to determine the propriety of accepting, transmitting, or forwarding them. Several different filtering opportunities exist. A packet could be inbound to a "local" computer connected to the switch device (i.e., on the receiving network), inbound but destined to be forwarded to another network, or originating from the local network and destined for another network (outbound). Also, the packet could originate from the local network and be destined for the local network.

FIG. 1 illustrates a high-level schematic view of the operation of a prior art data communications device, such as a router or switch. The device is generally referred to as a "router," although persons of ordinary skill in the art will recognize that other networked data communications devices may serve an equivalent function.

A number of flows 20, i.e., simultaneous packet- or frame-based messages from multiple sources, are presented to router 10. These flows each consist of multiple packets of data, in a variety of sizes and presented at a variety of rates. Flows may be presented in different protocols, such as the Transmission Control Protocol/Internet Protocol (TCP/IP) and the related User Datagram Protocol (UDP), File Transfer Protocol (FTP), Terminal Emulation Protocol (Telnet), and Hypertext Transfer Protocol (HTTP). Other internetworking protocols are found in the literature, such as Merilee Ford, et. al., *Internetworking Technologies Handbook,* Cisco Press 1997, (hereinafter *Ford*) incorporated herein by reference in its entirety. The packets are buffered in a buffer pool 30, which is typically random access memory (RAM). Buffering is accomplished according to the directives of a controller 60 and a buffer manager 25. Controller 60 includes a forwarding engine, not shown, which determines on a packet-by-packet basis the proper destination ("routing") of each packet. This determination is made from information contained within each packet. The flows are sent to the proper output port 70 by way of a set of output queues 40 and a port scheduler 50. Controller 60, buffer manager 25, and port scheduler 50 are conventionally implemented as one or more high speed microprocessors or custom ASICs with associated interface circuitry.

Routers are described in greater detail in *Ford,* Chapter 5 and Karanjit S. Siyan, *Inside TCP/IP,* 3d ed., New Riders Publishing 1997 (hereinafter *Siyan TCP/IP*), incorporated herein by reference in their entirety.

Access control functions in routers and related network communications devices are typically implemented in controller 60 with the co-operation of the forwarding engine. Access controls are discussed generally in Karanjit Siyan and Chris Hare, *Internet Firewalls and Network Security,* 3d ed., New Riders Publishing 1995 (hereinafter *Siyan Firewalls*); and D. Brent Chapman and Elizabeth D. Zwicky, *Building Internet Firewalls,* O'Reilly & Associates, 1995 (hereinafter *Chapman*). Both *Sivan Firewalls* and *Chapman* are incorporated herein by reference in their entirety.

Understanding the background of the present invention requires familiarity with the terminology and organization of modern networking. In particular, an understanding of the functions performed at each layer of the communications hierarchy is required. These functions are generally described by the Open Systems Interconnection (OSI) reference model, well known in the art. See, e.g., *Ford,* Chapter 1 and *Siyan TCP/IP* Chapter 2.

Packet Filtering With Access Control Lists

An access control list (ACL) is a set of rules for evaluating whether a packet should be permitted to pass or denied routing. As applied to routers, an ACL is implemented as a series of commands that program the router to permit or deny packet access to the routing function. Various classes or families of internetworking devices, such as the Cisco Systems® Catalyst® family of switches and the Cisco 7xxx family of routers, respectively, share common command sets and syntax for ACL programming. The command set and syntax used in Cisco routers is more fully described in *Network Protocols Configuration Guide. Cisco IOS® Release* 12.0, Cisco Press, 1998, (hereinafter *IOS Guide*), incorporated herein by reference in its entirety.

The party controlling or maintaining the router (typically, the network administrator) must define the rules by which packet routing is to be controlled. The conventional process of defining these rules is further described in *Chapman,* Chap. 6 and *Siyan Firewalls,* Chap. 4. Rule definition is accomplished by commanding the router in accordance with the particular command syntax and programming method appropriate to the type of router used. The router's operational software (e.g., the Cisco IOS) then translates the access list commands into a form useable by the router. For example, the Cisco family of routers programming syntax is described in the *IOS Guide* referenced above. The complete Cisco IOS command set is described in further detail in *Network Protocols Command Reference, IOS Release* 12.0, Cisco Press, 1998 (hereinafter *IOS Command Reference*), incorporated herein by reference in its entirety.

ACL rules can be simple when expressed in plain English, such as "Permit TCP packets from any source to host with IP address equal to 194.121.68.173 and TCP port number greater than 1023" or complex, such as "Permit UDP packets from any source to host with IP address equal to 142.175.12.40 and TCP port number less than 1023, but not equal to 21, 80, or 128." In the first example, the corresponding Cisco IOS router command, for example, contains a single rule element:

permit tcp any host 194.121.68.173 gt 1023 where "gt" represents "greater than." In the latter example, there are four elements to the rule, thus requiring four commands to the router:

deny udp any host 142.175.12.40 eq 21
deny udp any host 142.175.12.40 eq 80
deny udp any host 142.175.12.40 eq 128
permit udp any host 142.175.12.40 lt 1023

Another common rule example is "Deny TCP traffic going to host with IP address equal to 131.124.87.95 and TCP port number range from 6000 to 6002." represented in command form as:

deny tcp any host 131.124.87.95 range 6000 60002

Rules may also be expressed in terms of permitting or denying access to or from certain destination or source IP addresses (respectively), e.g., "Deny IP traffic coming from subnet 173.201.0.0" In such situations, the rule command includes the IP address of interest:

deny 173.201.0.0 0.0.255.255

One prior art method used in relatively slow routers required the operational software to interpret the ACL programming commands into a series of conditional statements, such as the well-known software "CASE" statement. ACL filtering was thus accomplished in software using the interpreted commands directly. This method limited the packet throughput, however, because processing depended on software execution speed.

A faster and more compact method of applying ACL rules is to convert the rule elements into entries in a content-addressable memory (CAM). Content-addressable memories, well-known in the art, allow a simultaneous search of all entries by performing a bit-wise comparison of an input value (the key or comparand) against every entry at the same time. If a match is found between the key and an entry, the CAM returns the address of the matching entry. This address may be used directly by the function requesting the comparison or, more commonly in ACL filtering applications, it may be used as a pointer to a conventional memory array to return another value. In a typical ACL application, the conventional memory contains the action to be taken for a packet whose flow label matches the corresponding CAM entry, such as "permit" or "deny." (A flow label, also known in the art as a netflow label, contains a series of fields identifying a packet.)

In the context of ACL filtering, CAMs are used to hold bit masks representing elements of the ACL rules. The various rule elements are each implemented by one or more entries in a CAM. For example, the rule element "eq" is the simplest CAM entry, because a CAM is designed to test for equivalence between the key and each entry in the CAM. Thus, if the rule is "deny packets from port 80," the corresponding CAM entry is a bit string representing a value of 80 in the portion of the string corresponding to the port number. Note that, as the rules are typically more complex than simple filters on port numbers, the CAM entries typically consists of multiple fields corresponding to the parts of the conventional flow label of a packet. Such fields typically include the IP source address, IP destination address, source port number, destination port number, type of service (TOS), and Layer 3 and Layer 4 protocol identification. For simplicity, the following examples reflect the portion of the rule element and the corresponding CAM entry corresponding to a single port field (either source or destination). Typical rules filter on more than one flow label field, thus requiring CAM entries many bits wide.

The rule elements are evaluated top to bottom in order to define CAM entries. Their ordering is the sole means by which conflicts between rule elements are resolved, because the typical CAM used for ACL filtering returns the address of only the first matching entry. Thus, a long rule specifying, for example, that packets of a certain Layer 3 protocol (e.g. IP) sent by TCP source port x and destined to destination address a.b.c.d (representing the IP standard dotted-decimal addressing notation) should be permitted, will be first decomposed into its respective elements by the router command interpreter software. The resulting elements are sequenced in the order specified in the rule (in this example, L3 protocol, then TCP source port, then destination address), and the CAM is filled in the order defined by the sequence of rule elements, one rule at a time.

Although one method of filling a CAM is described, those skilled in the art will realize that other methods may be used, such as those requiring additional processing prior to writing the CAM. Accordingly, the invention is not limited to any particular method of filling the CAM.

The rule element lt 6, for example, is implemented in a conventional CAM-based ACL processing system with six entries. Each entry represents a bit mask that matches a port number (either source or destination, as specified in the rule) having any of bits [15:10] set, to wit:

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Elements | 0 | 0 | 0 | 0 | 0 | 0 | 0 | 0 | 0 | 0 | 0 | 0 | 0 | 0 | 0 | 0 |
|  | 0 | 0 | 0 | 0 | 0 | 0 | 0 | 0 | 0 | 0 | 0 | 0 | 0 | 0 | 0 | 1 |
|  | 0 | 0 | 0 | 0 | 0 | 0 | 0 | 0 | 0 | 0 | 0 | 0 | 0 | 0 | 1 | 0 |
|  | 0 | 0 | 0 | 0 | 0 | 0 | 0 | 0 | 0 | 0 | 0 | 0 | 0 | 0 | 1 | 1 |
|  | 0 | 0 | 0 | 0 | 0 | 0 | 0 | 0 | 0 | 0 | 0 | 0 | 0 | 1 | 0 | 0 |
|  | 0 | 0 | 0 | 0 | 0 | 0 | 0 | 0 | 0 | 0 | 0 | 0 | 0 | 1 | 0 | 1 | where "0"=logic zero and "1"=logic one. (Note that this example only shows one of the many fields typically present in a CAM entry as currently used in the art.) If the key matches all bits in an entry, the corresponding action (permit or deny) stored in the memory location pointed to by the address of the matching entry is taken.

Clearly, the more elements in a given rule (i.e., the more complex it is), the more CAM entries required. Fundamentally, a CAM requires an entry, either in width or depth, for each element one wishes to filter access on. Thus, as rule sets increase in complexity, both in terms of number of rules and number of elements within each rule, the CAM needs to grow both wider and deeper. Additional width (i.e., the number of bits in each entry) is required to provide for ANDing of rule elements between different fields in the key. For example, a two-element rule testing for L3 protocol=IP and source address=179.0.0.0 requires testing both the L3 protocol and source address fields. Additional depth is required simply to accommodate all of the rules and rule elements.

FIG. 2 describes the prior art process of ACL filtering. A packet is initially received for access control processing at step 210. In general, this step may be accomplished by dedicated hardware circuitry or software means. A flow label, identifying the packet from its header information and including, for instance, Layer 3 protocol, source, and destination fields, is assembled in step 220. In some prior art implementations, the flow label is already defined elsewhere in the router and serves as an identifier for each packet.

The flow label is used as the key (comparand) for a CAM lookup in step 230. The entire flow label or a subset of its fields may be employed as the key. They key may be created by reordering the flow label as well. Depending on the rule elements loaded into the CAM, the key will either match a CAM entry or not. When a match is found, the CAM returns the address of the matching entry. This address may be used directly as a permit/deny indicator. More commonly, however, the returned address is used as a pointer into an associated memory space, such as a conventional static RAM (SRAM). The SRAM, in one instance an n by 1 bit organization where n is the maximum number of CAM entries, contains a single bit flag for each possible pointer value. The flag indicates "permit" when set and deny when clear. Additional actions are also possible, including forwarding to a CPU.

In the event that the key is not found in the CAM, the default condition, for example, deny, is asserted for the packet. Step 240 consists of reading the SRAM entry pointed to by a successful match in the CAM or denial of access in the default, i.e., when no match is found.

The ACL processing step then loops and waits for the next packet arrival, step 250.

Drawbacks of the Prior Art

The prior art necessitates a large number of entries for large and complex ACL rule sets. These complex rule sets require multiple entries in a CAM to apply a given complex rule. Modem systems can require thousands of rules. Thus, CAMs for such ACLs rapidly grow to unmanageable depths (i.e. size in terms of number of entries). The power consumed by such CAMs and their cost rapidly become excessive.

Furthermore, the CAM size problem is only exacerbated by the expected shift to Internet Protocol version 6 (IPv6), which uses 128 bit addresses instead of the current 32 bit addresses used by IPv4. This shift requires wider CAMs. For a given size CAM, as the width increases, the depth must correspondingly decrease. This increases sensitivity to ACL entry expansion.

What is needed is a generalized process for pre-computing certain commonly-repeated rule elements and incorporating a "shorthand" code (or auxiliary field) representing the results as part of the lookup key so that a match to a single, extended CAM entry (extended by the addition of the shorthand code) will indicate the result of applying a set of rule elements. In this manner, the depth of the CAM needed to implement a given rule can be greatly reduced, thus reducing cost and power consumption. Alternatively, for a given size of CAM, more rules and/or more complex rules can be implemented without increasing the cost of the device.

Cisco Systems, Cisco IOS, and Catalyst are registered trademarks of Cisco Systems, Inc. of San Jose, Calif.

SUMMARY OF THE INVENTION

The present invention performs logical operations on fields within the flow label characterizing a received packet or frame of data and uses the results, along with other packet/frame-identifying data, to generate a more efficient content addressable memory (CAM) lookup key. A CAM lookup is used to determine the packet action indicated by the rules defined by a rule-based routing or switching decision process, such as an access control list (ACL). The results of these logical operations extend the key space (i.e., the width of the key) by adding additional fields to the key. This provides a finer-grained match between the original, unextended input key and a rule action contained in the CAM. A fine-grain key match in the CAM thus points to a rule action precisely tailored to packet processing. The rule can thus be applied with fewer CAM entries, providing the rule application versatility improvement and CAM cost reduction necessary to keep up with the ever-increasing rule complexity requirements of advanced data communication and internetworking systems.

Both conventional CAM and ternary content-addressable memories (TCAM) implementations are described. Use of a TCAM for ACL lookups further enhances the efficiency of ACL processing by providing a masking capability for each TCAM entry that can be used to provide an additional level of rule element checking.

BRIEF DESCRIPTION OF THE DRAWINGS

The present invention may be better understood, and its numerous objects, features, and advantages made apparent to those skilled in the art by referencing the accompanying drawings.

FIG. 4 depicts the contents of a packet flow label according to one embodiment of the present invention.

The use of the same reference symbols in different drawings indicates similar or identical items.

DETAILED DESCRIPTION

Introduction

Presently disclosed is an apparatus and method of use thereof for enhancing the speed and efficiency of rule-based processing in a router or other internetworking device concerned with packet-level filtering and access control. Such processing includes, but is not limited to, access control list (ACL) processing as known in the art. Although the terms router and/or switch will be used generally in this specification, those skilled in the art will realize that other related internetworking devices may be used, in addition to routers or switches, to perform analogous functions. Accordingly, the invention is not limited to any particular type of internetworking device, router, or switch. Also, although the primary focus of the current invention is Internet Protocol (IP) packet flows over Ethernet, those skilled in the will art realize that protocols and flows other than IP, such as IPX, can be benefit from the present invention and its alternate embodiments. Accordingly, the invention is not limited to any particular type of protocol or packet format.

Figure 1:
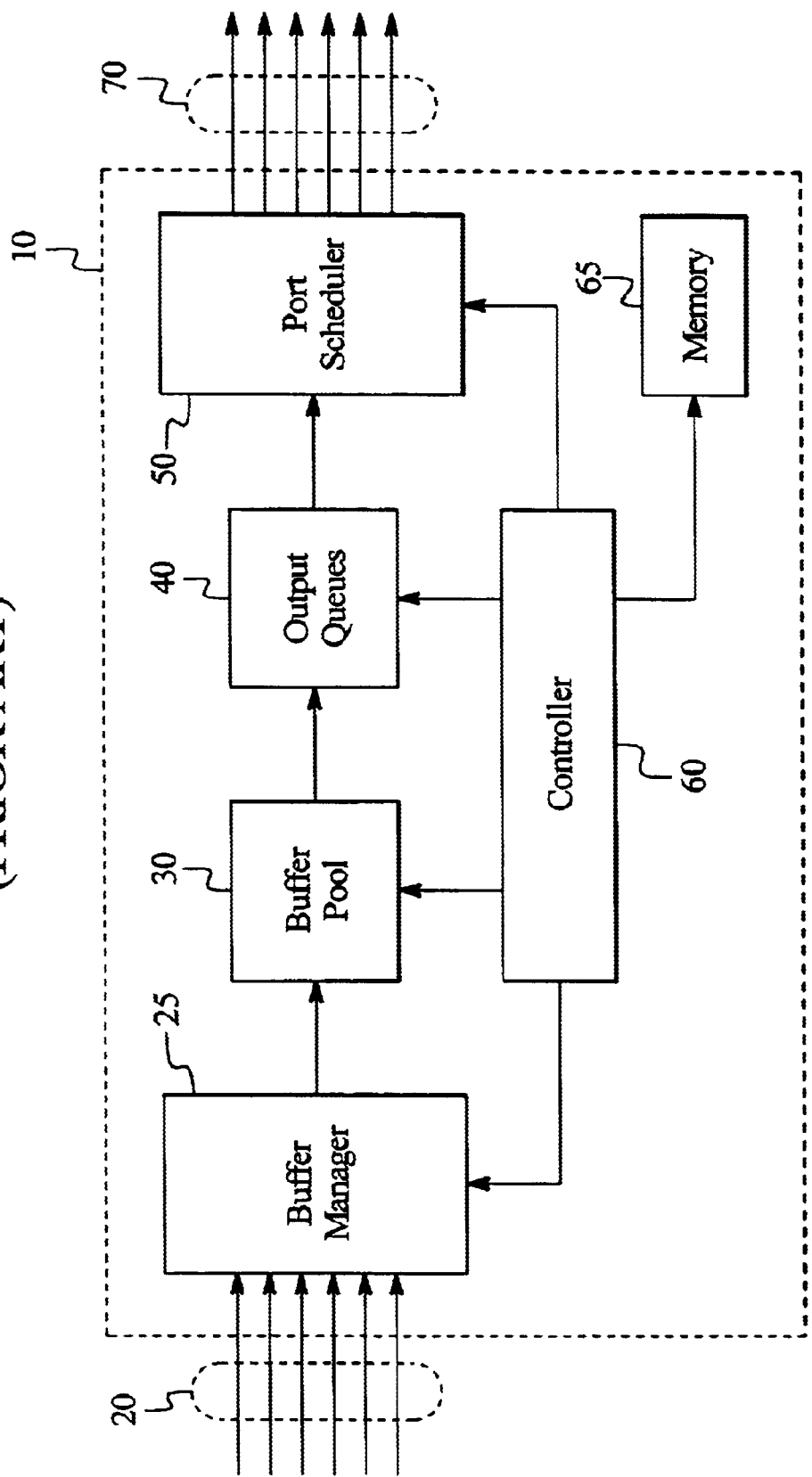
FIG. 1 is a high-level schematic representation of data flow and control in a generic router/switch well-known in the art.
Figure 2:
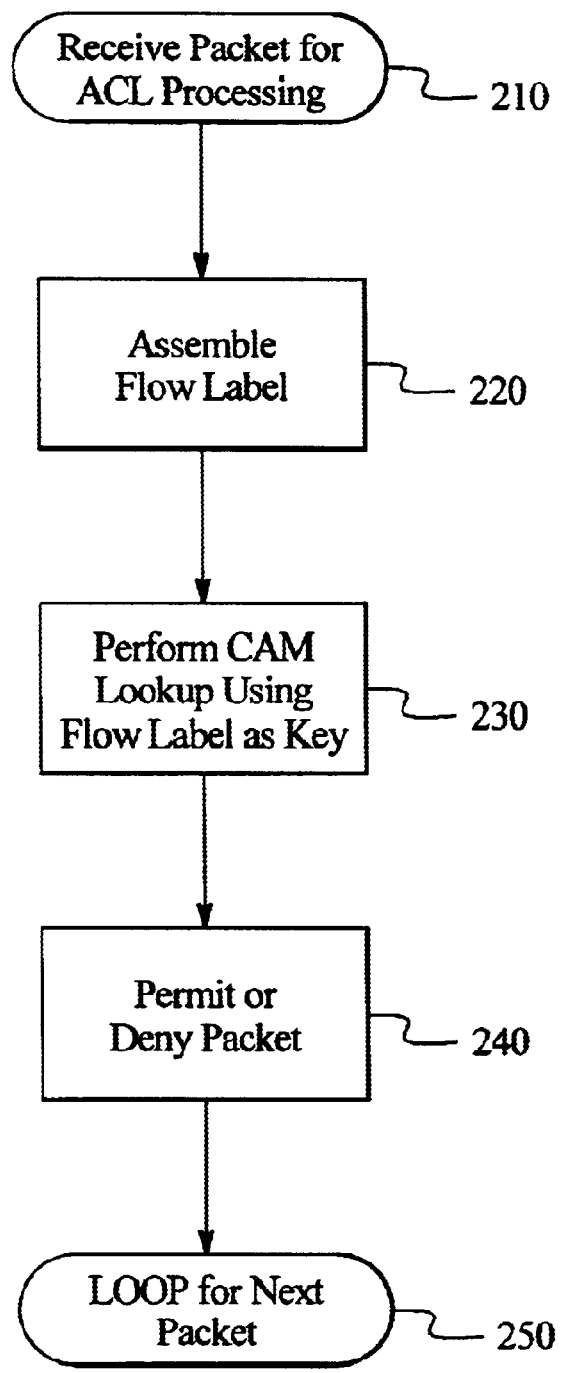
FIG. 2 is simplified flowchart of the prior art ACL processing method.

The present invention is implemented as part of an otherwise conventional router or switch system well known in the art, such as that depicted in FIG. 1. Other examples of such systems may be found in U.S. Pat. Nos. 5,088,032, METHOD AND APPARATUS FOR ROUTING COMMUNICATIONS AMONG COMPUTER NETWORKS, to Leonard Bosack and U.S. Pat No. 5,740,171, ADDRESS TRANSLATION MECHANISM FOR A HIGH-PERFORMANCE NETWORK SWITCH, to Mario Mazzola et al., incorporated in their entirety herein by reference.

The present invention provides for the pre-processing of elements of the flow label associated with a packet in a conventional router. This pre-processing produces certain additional information in the form of an auxiliary field or fields that is/are appended to the flow label to create an extended lookup key for use in a content-addressable memory (CAM) configured for access control list processing. In particular, a CAM configured according to the present invention contains additional fields corresponding to the results of the pre-processing step. These auxiliary fields are configured so that each entry containing values in the additional fields substitutes for multiple entries typically required in conventional CAM-based ACL processing schemes.

High-Level Block Diagram

Figure 3:
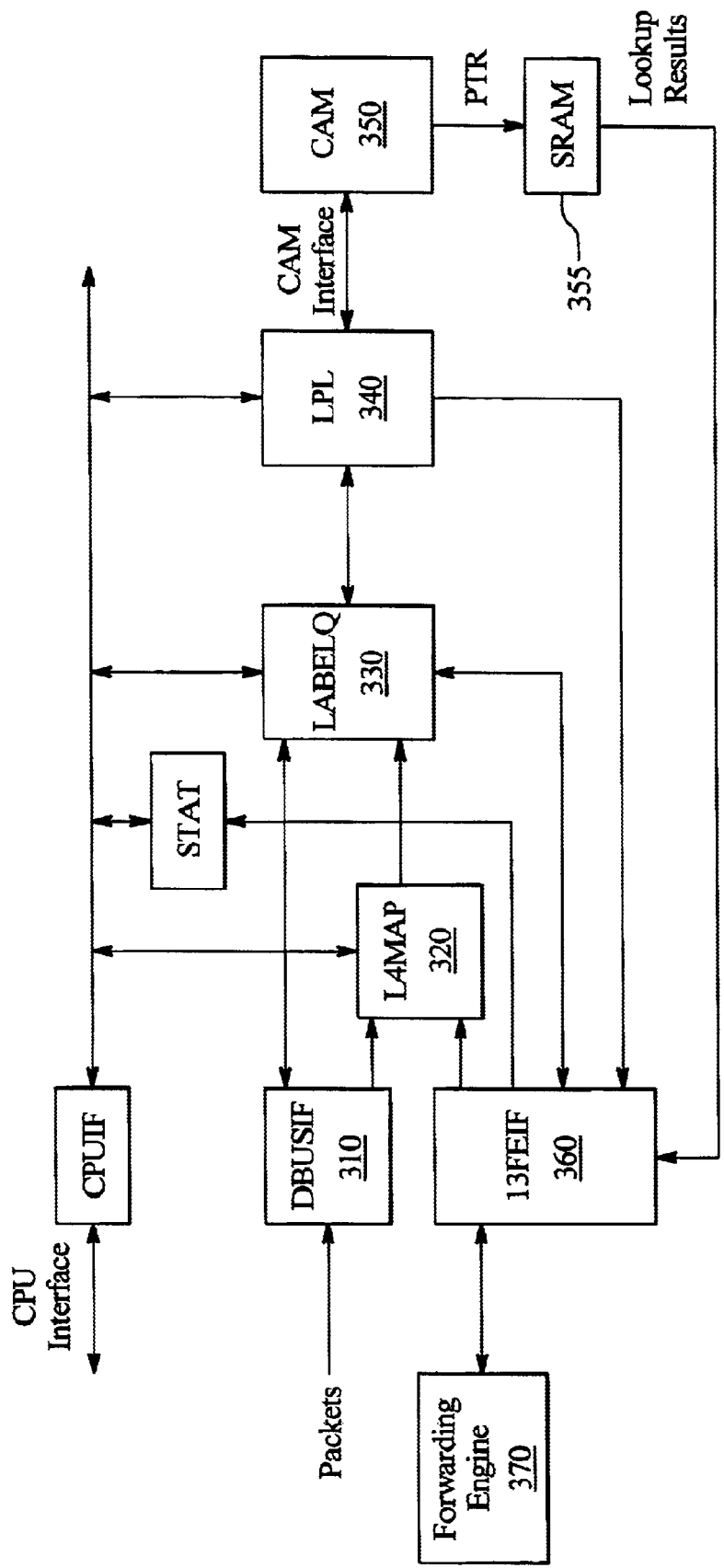
FIG. 3 is high-level block diagram of one embodiment of the present invention.

FIG. 3 is a high-level block diagram of one embodiment of the present invention. Frames of data, consisting of a single packet and certain router-generated header information, are received from an internal switch bus (called, in one embodiment, the DBus) at DBus interface (DBUSIF) 310. Also referred to as the input interface circuit, DBUSIF 310 parses each received frame to form flow label 400. Most of the information required to form the flow label is found in the packet; some of the information is read from the frame header. FIG. 4 shows, in tabular form, the contents of flow label 400. Flow label 400 consists of several fields readable by subsequent processing circuits. The source of each field in the flow label is also described in FIG. 4. Note that, as initially supplied by DBUSIF 310, several fields in flow label 400 are empty. Subsequent processing described herein, for ACL label 405 and L4OPs 430–432 and alternate 410, fill in these previously undefined elements.

One of ordinary skill in the art will recognize that the above described parsing step may be accomplished by either hardware or software means or a combination thereof, such as a lookup table. Accordingly, the present invention is not limited to any particular parsing means.

The flow label 400 is passed to the Layer 4 mapping unit L4MAP 320 along with the packet's interface number (from the DBus frame), where the interface number is mapped onto ACL label 405. (L4MAP 320 is also referred to as the mapping circuit.) The interface number (or "interface designation") represents the physical connection upon which the particular packet in the current frame entered the router. This number thus identifies the source network connection at the highest level, since the physical connection of each router port to the rest of the network is known. The ACL label is an identifier that associates a given network connection with the access control list defined for that interface. For example, if a router is configured so that it is connected to a network operated by MCI Worldcom on interface number 3 (i.e. the physical cable connecting to MCI Worldcom;s network is plugged into the router external connector designated interface number 3), then the ACL list appropriate to MCI Worldcom traffic, designated by ACL label "MCI3," is to be applied to any packets coming from (or going to) interface number 3. The ACL label, designated 405 in FIG. 4, is inserted into flow label 400 by L4MAP 320.

Note that an interface maps to one ACL label, but multiple interfaces can also map to the same interface label. This allows the same filtering to be applied to packets of a general class. In the example above, if traffic from MCI comes in on ports 3 and 4, then the interfaces 3 and 4 can both map to the same ACL label.

L4MAP 320 also contains a logic circuit that performs, in a substantially parallel process, a group of logical functions or operations on one or more readable fields in the flow label. Specifically, in one embodiment of the present invention, the L4 source and destination port numbers, 410 and 420 respectively in FIG. 4, are processed in Logical Operation Units (LOUs) (not shown) within L4MAP 320. The LOUs are individually pre-defined (e.g., programmed) at router configuration time to perform a limited set of functions on a designated subset of flow label fields. This programming is determined by the elements of the ACL rules associated with each ACL label. Together, the results of the concurrent execution of these logical functions form a result vector. In normal operations, the selection of which LOUs within the result vector are applied to which flow label fields (in one embodiment, L4 source port number 410 and L4 destination port number 420) is uniquely determined by the ACL label associated with each packet's interface number. Operation of the LOUs is discussed in greater detail below. The selected outputs of the designated LOUs (L4OPs) are concatenated or combined into the flow label. In one embodiment, the L4OPs are placed at positions 430 and optionally 431, 432, and 410. Optional positions 431, 432, and 410 contain the higher-order bits of the LOU outputs when required.

Although a CAM lookup utilizing an extended key derived from router (L4) interface numbers is described, those skilled in the art will realize that lookups based on packet or data frame information other than L4 data can be used. In fact, any packet information, including but not limited to ToS bits, QoS or CoS fields, or packet statistics, from any layer in the OSI Reference Model (or whatever model most appropriately describes the communications interface) can be used to optimize packet processing in accordance with the present invention. Consequently, the invention is not limited to any particular type or format of packet, readable packet field, L4OP operator, or extended key. The present invention will implement any rule-based filtering function using one or more fields in a packet or frame of data.

The now-modified flow label is next passed to the Label Queue (LABELQ) module 330, which provides (at a minimum) elastic buffering for the lookup requests to the CAM.

LABELQ 330 (FIG. 3) passes the modified flow label to lookup pipeline module (LPL) 340, which controls CAM 350 and its associated lookup pipeline. The pipeline is a high speed parallel connection. LPL 340 handles all of the interfacing and flow control between LABELQ 330 and CAM 350.

When a lookup produces a match, CAM 350 produces a pointer to a location in SRAM 355. SRAM 355 in turn passes the contents of the address designated by that pointer to L3 Forwarding Engine Interface (L3FEIF) 360, which communicates that information to the router's Forwarding Engine 370 to control the routing of the packet.

Collectively, LABELQ 330, LPL 340, CAM 350, and SRAM 355 form the lookup interface circuit for the output of the logic unit portion of L4MAP 320.

Although a content-addressable memory (CAM) is described generically, those skilled in the art will realize that commercially available CAMs include numerous functionally-equivalent variants, such as the ternary CAM (TCAM) with entry-level masking. Accordingly, the invention is not limited to any particular type of CAM.

In an alternate embodiment, LABELQ 330 serves two purpose: it provides elastic buffering for the lookup requests to the CAM for inbound packets and flow label buffering in support of outbound packet processing. "Inbound packets" are those packets being filtered on receipt by the router to determine if they are to be allowed to pass through (i.e. to be routed by) the router. Inbound packets are tested based on their sources. "Outbound packets" are those packets that are ready to be forwarded out of the router and are to be tested based on their destinations. As will be discussed in further detail, ACL processing differs slightly between inbound and outbound packets.

Sequence of Events

Figure 5:
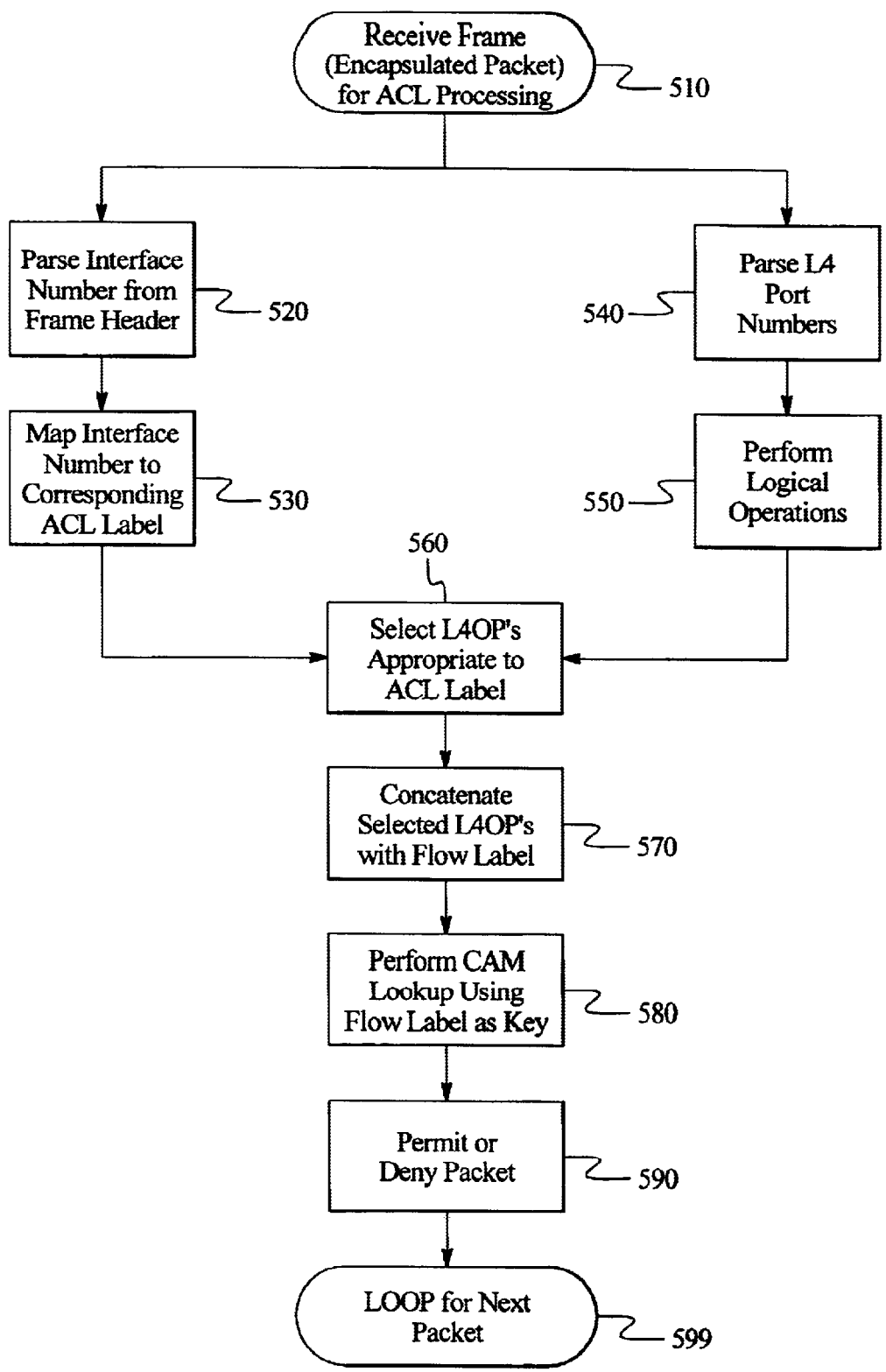
FIG. 5 is simplified flowchart of the generalized process of the present invention.

FIG. 5 is a simplified flowchart according to one embodiment of the method of the present invention. Operation begins on receipt of a frame of data 510 from the router's internal DBus. This frame contains the complete packet of data as sent over the network plus a DBus header prepended by the router's port device. The DBus header consists of certain router-specific internal data and includes an interface identification number (interface number) showing the physical ID of the router connection on which the packet was received.

Two procedures operate in parallel at this point. In one, the readable field containing the interface number is parsed from the DBus header, 520, by the DBus interface (DBUSIF) 310 (referring to FIG. 3). The interface number is mapped 530 to a corresponding ACL label in L4MAP 320. This mapping consists of a simple table lookup of the interface number in a structure created at router configuration time. This structure is programmed to show the relationship between each physical router interface (designated by its interface number) and the appropriate ACL list associated thereto. This configuration is an essential part of the router's set-up and programming and is well-known in the art. See, e.g., *IOS Guide* and *IOS Command Reference*.

At essentially the same time, the L4 port number readable fields are parsed 540 from the packet itself (along with other data) to create a flow label 400 (see FIG. 4 for a description of the contents of the flow label, according to one embodiment of the present invention). This parsing step is also performed by DBUSIF 310. The LOU portion of L4MAP 320 reads flow label 400, and in particular the L4 port information 410 and/or 420, and performs certain functions, referred to as logical operations, on the data in step 550. These logical operations form a result vector. Logical operations 550 are discussed in further detail below.

The ACL label is then used, step 560, to select (extract) the particular logical operation outputs ("L4OPs") appropriate to the access control list associated with the packet. This selection is a subset of the L4OPs present in the result vector output by the LOU. The selected L4OPs form an auxiliary field that is combined with the flow label, step 570, extending its width and creating a lookup key (comparand) which is then used to access a CAM lookup in step 580. Based on the value returned from CAM-associated SRAM 355, the packet is either permitted or denied further routing, step 590. (The packet may also be sent to the device's CPU, not shown.) The process loops at step 599 to perform ACL processing on the next packet.

In an alternate embodiment, access control processing differs depending on the whether the access being tested is that of an inbound packet or an outbound packet. "Inbound packets" are packets coming into the router. "Outbound packets" are those for which a routing path has been determined and are ready for transmission out of the router. Outbound packets may or may not be enqueued prior to transmission.

Figure 6:
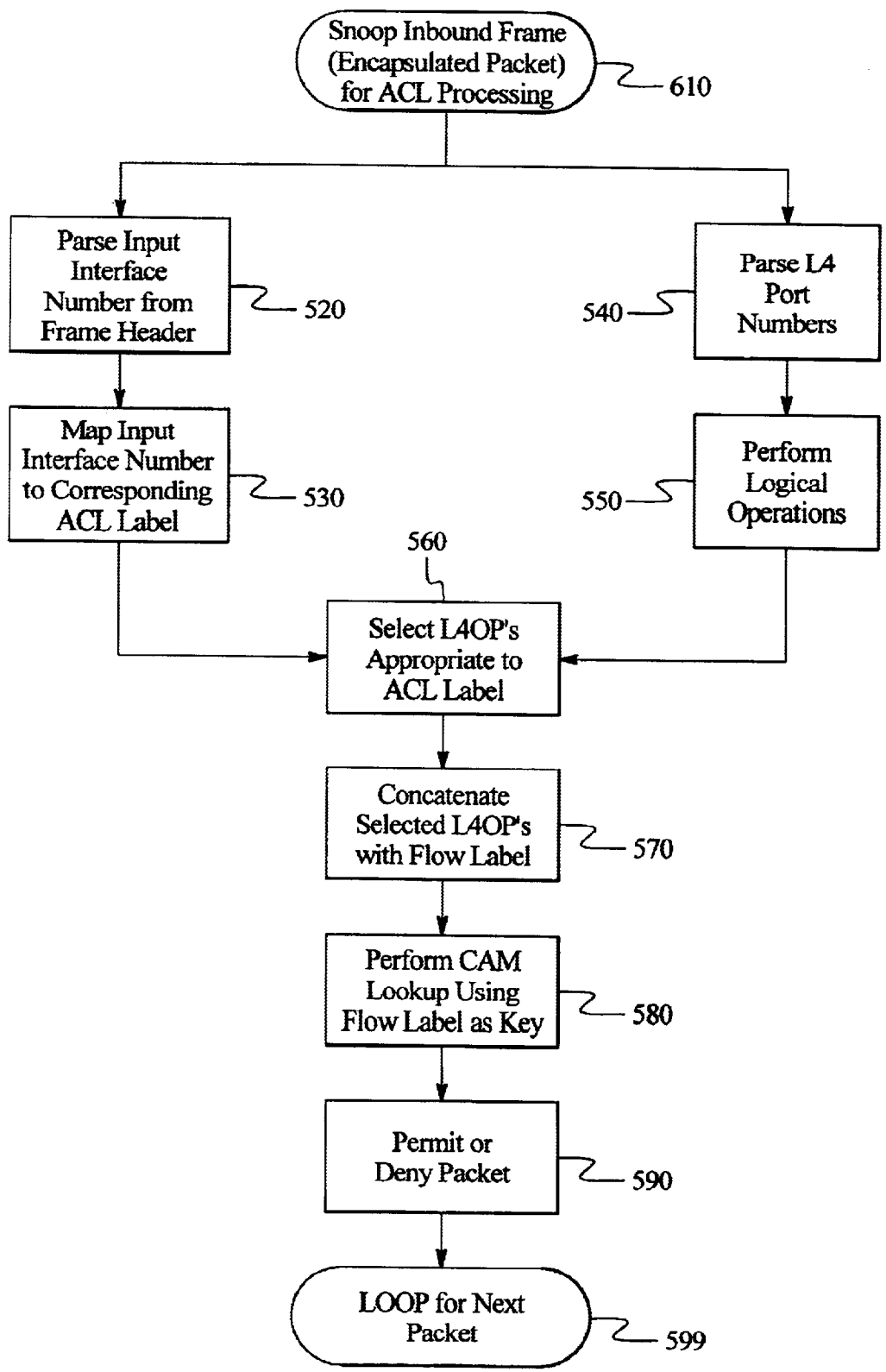
FIG. 6 is a simplified flowchart of the specific process performed on inbound packets, according to an alternate embodiment of the present invention.

As shown in FIG. 6, inbound packets: are first "snooped" in step 610, according to this alternate embodiment of the present invention. When a packet comes into the router and the routing function is initiated, the packet is placed on the DBus as part of a DBus frame. (As discussed above, the DBus frame contains the packet and an additional header. Within that header is the input interface number identifying the physical interface where the packet entered the router.) As the DBus frame is sent over the DBus to other elements of the router, DBUSIF 310 reads the frame without interrupting its journey.

Access list processing for inbound packets proceeds as described above and in FIG. 5. The result (permit or deny, step 590) is passed to the Layer 3 (L3) Forwarding Engine (L3FE) 370 to tell it to permit or deny further routing. However, even if the inbound packet is permitted, the precise routing (determined via conventional means in the L3 Forwarding Engine 370) defines an output interface which typically has a different ACL associated with it. Thus, a second ACL processing sequence is required once the output interface for the next hop is determined by L3FE 370. This second pass is aided by the fact that LABELQ 330 has a buffered copy of the flow label associated with the packet already in place. The L3FE 370 thus only needs to pass the output interface number to L3FEIF 360 in a request message. L3FEIF 360 then accesses L4MAP 320, which in turn maps the output interface number to the corresponding ACL label and associates the ACL label with the proper outbound port's flow label retrieved from LABELQ 330. Further ACL processing then proceeds as above.

Figure 7:
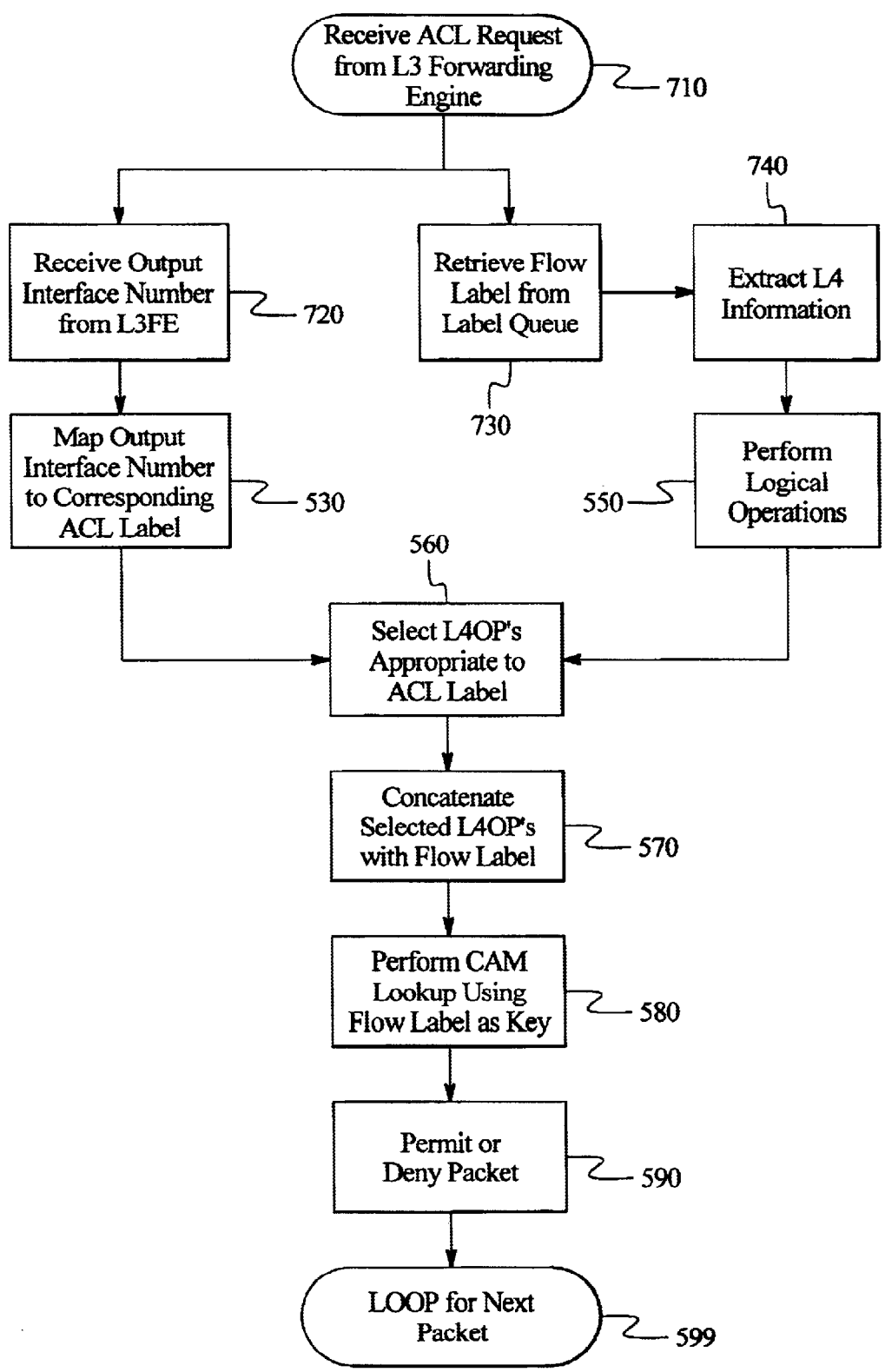
FIG. 7 is a simplified flowchart of the specific process performed on outbound packets, according to an alternate embodiment of the present invention.

FIG. 7 shows the particular processing steps for an outbound packet, according to this alternate embodiment of the present invention. An ACL request message is first received from L3FE 370 in step 710. The request message 710 contains the output interface number for the outbound packet, which is read in step 720. The output interface number is mapped to a corresponding ACL label, as above, in step 530. At substantially the same time, the flow label is retrieved from Label Queue 330 by L4FEIF 360 in step 730. With both the output interface number and the flow label known to L3FEIF 360, extracting the Layer 4 information 740 and logical operations 550 can commence as for the inbound packet. Steps 560 through 599 proceed in sequence as above.

Functional Block Descriptions

In one embodiment of the present invention, expedited access control list (ACL) processing is provided by a custom ASIC known by the development name "Perseus" in combination with a TCAM/SRAM chipset. The following detailed explanation of the Perseus system implementation is thus intended to describe a particular embodiment of the present invention without limiting the invention to the Perseus embodiment. One of ordinary skill in the art will readily appreciate that the present invention may be implemented in various forms, including electrical circuits of discrete components, integrated circuits, and apparatus based in whole or in part on software or firmware. Additionally, the method of operating an apparatus according to the present invention is similarly within the scope of this disclosure.

Overview

At its core, ACL processing consists of one or more lookups. Each lookup compares a value representing the flow label or portions thereof for a single packet against CAM entries representing the ACL rules. This flow label is the key used for the CAM lookup.

Each lookup produces the following raw information:
Hit or miss
Index to the Result SRAM
Contents of the Result SRAM indexed by the CAM output The information is then processed by Perseus and communicated back to the Layer 3 Forwarding Engine. The information returned includes of:
Packet classification: permit/deny and forward
Hit/miss and error indicators
Sequence number
General purpose information, such as an index to a table Perseus implements the two-track processing scheme of the alternate embodiment described above: different lookup processes are employed depending on whether the lookup is for an inbound or an outbound packet. Consequently, Perseus can perform up to four types of lookups for each packet received from the DBus, although the present invention is not limited to only four types. They are type 0, 1, 2, and 3 lookups. The four lookups can consist of three input interface lookups and one output interface lookup, or two input interface lookups and two output interface lookups. Each lookup type can be individually enabled or disabled. The enable or disable can only be done during system startup.

Type 0 and Type 1 Lookup

Type 0 and 1 lookups are associated with the input interface. Type 0 lookup is currently assigned as the input interface (or "inbound") ACL lookup. Type 1 lookup is currently assigned as a quality of service (QoS) lookup, i.e., a lookup to determine the QoS to apply to the packet based on one or more fields within the flow label. When a packet arrives from the DBus, information is extracted (snooped) from the packet to form a flow label. Type 0 and type 1 lookup may have the same or different information in their flow labels. Perseus uses the flow label to perform ACL lookup for the input interface. The details of the flow labels are described later in the document.

Type 2 Lookup

Type 2 lookup can be assigned to an input interface (inbound) or an output interface (outbound) lookup. When it is associated with an input interface, it uses the same flow information as the type 1 lookup except the type field can be different. If it is programmed as an output interface lookup, it uses the same flow information as the type 3 lookup except the type field can be different. The Type 2 lookup is a QoS lookup.

Type 3 Lookup

Type 3 lookup is associated with the output interface. It is used by the L3 Forwarding Engine as the output interface (outbound) ACL lookup. The lookup cannot start until the output index (i.e. output interface number) of the packet is identified. After the L3 Forwarding Engine identifies the output interface number for the packet, it sends the interface number to Perseus for type 3 lookup. Perseus assumes the output indices are delivered in the same order as the packets were received from the DBus. The sequence number accompanying the output interface index is checked against the sequence number obtained from the input packet. If there is a mismatch, a sequence error will be reported (discussed below).

Once the flow label is constructed using the output interface number, Perseus performs the same operation as the input interface (inbound) lookup and returns the result in the same format.

Although four specific types of lookups are described, those skilled in the art will realize that lookup types other than those listed can be used. Accordingly, the invention is not limited to any particular set of lookup types. Furthermore, the invention is not limited to embodiments using only four lookup types; embodiments using both more or less lookup types are contemplated as being within the scope of the present invention.

DBus Interface (DBUSIF)

Packets coming from the router line cards are sent to the 256-bit wide DBus. A 32-byte header is added on top of the packet itself. The DBus header is transferred on the first cycle of the data transfers. Perseus snoops the information coming from the DBus to perform lookups for the input interface.

The DBUSIF extracts (i.e., snoops) information from a DBus frame to form a flow label. Some of the flow label can be derived from the DBus frame header. The remaining parts are extracted from the packet body.

In addition to constructing the flow label for an input interface, the DBUSIF also performs error checking on the frame.

DBus Handshake

The DBus interface detects valid DBus data transfers and captures information from the DBus for further analysis.

The DBus frame header is protected by the checksum field in the header. After a valid transaction is detected on the DBus, the header checksum is computed and compared with the checksum field in the frame header. The checksum computation happens in parallel with packet parsing. If there is a checksum mismatch, an error indicator is set on the parser outputs. A dummy lookup will be performed.

Flow Label

Perseus performs CAM lookup by sending a flow label to the CAM for comparison. The information in the flow label depends on the types of Layer 2, Layer 3 and Layer 4 protocols. The Layer 3 protocol type is included the DBus frame header. The DBus currently supports the IPv4, IPX, AppleTalk, DECnet, Vines, XNS, and IPv6 protocols. The flow label includes Layer 3 information for IPv4 and IPX protocols and Layer 4 information for IPv4.

The maximum width of a label (in this embodiment) is 134 bits. Information included in the flow label depends on the layer 2, 3, and 4 protocols. The flow label bit assignments for TCP/UDP and IPX packets are defined in Tables 1 and 2. If a packet is an IPv4 packet and its L4 protocol field is not TCP or UDP, it uses the same flow label format as TCP/UDP except that the 14_destport, 14_srcport, 14op, and establish fields may carry other information.

Other flow types can include IGMP and ICMP packets. Although certain flow label bit mappings are described, those skilled in the art will realize that other bit maps can be used. Accordingly, the invention is not limited to any particular flow label bit map.

TABLE 1

Flow Label of TCP/UDP Packet

| Field | Name | # of Bits | Flow Label Bit Position |
|---|---|---|---|
| IP destination address | ip_da | 32 | [3:0] |
| IP source address | ip_sa | 32 | [63:32] |
| L4 destination port number | 14_destport | 16 | [79:64] |
| L4 source port number/or L4OP [25:10] | 14_srcport/14op | 16 | [95:80] |
| L4 port operations (L4OP[7:0]) | 14op | 8 | [103:96] |
| Precedence/TOS | tos | 8 | [111:104] |
| ACL Label | acl_label | 9 | [120:112] |
| Established (TCP only)[1] | establish | 1 | [121] |
| Layer 3 protocol (set to 1) | proto_13 | 1 | [122] |
| Layer 4 protocol | prot_type | 8 | [130:123] |
| Logical BankSel or L4OP[8] | bank_sel/14op | 1 | [131] |
| Lookup type or {Type, L4OP[9]} | lookup_type/ type_14op | 2 | [133:132] |
| Total | | 134 | |

[1]Set to 0 for non-TCP protocols.

TABLE 2

Flow Label of IPX Packets

| Field | Name | # of Bits | Flow Label Bit Position |
|---|---|---|---|
| IPX destination network | ipx_destnet | 32 | [31:0] |
| IPX source network | ipx_srcnet | 32 | [63:32] |
| IPX destination node number | ipx_destnode | 48 | [111:64] |
| ACL Label | acl_label | 9 | [120:112] |
| Special (set to 0) | special | 1 | [121] |
| Layer 3 protocol (set to 0) | proto_13 | 1 | [122] |
| Packet Type | ipx_pktype | 8 | [130:123] |
| Logical BankSel or Reserved | bank_sel | 1 | [131] |
| Lookup type or {Type, reserved} | lookup_type | 2 | [133:132] |
| Total | | 134 | |

The DBus header uses a 4-bit field to represent the Layer 3 protocols and another 4-bit field to represent the frame type. Layer 3 protocols encoded in the DBus header are IPv4, IPX, AppleTalk, DECnet, Vines, XNS, and IPv6. Frame types encoded in the DBus header are Ethernet, TokenRing, FDDI, ATM, Voice, and Video. Two bits in the flow label are encoded to represent the flow label formats supported by Perseus.

L4OP Mux

The L4OP field only exists in the TCP/UDP label format shown in Table 1 above. Eight bits in the flow label are dedicated to the L4OP. Additional bits of L4OP are provided by setting the CAM Bank Select Register and Lookup Control Register with proper value. Fields that are used as additional L4OP are BankSel, bit 0 of Lookup Type, and the L4 source port number.

Parsing Packets

The packet parser extracts information from the DBus header and the packet body to build a generic label. Information included in the generic label is a superset of the flow label. Not all the fields in the generic label are used by Perseus. Some of them are specific to the L3 Forwarding Engine.

The flow label consists of Layer 2, Layer 3, and Layer 4 protocol information. Some of the Layer 3 information is available in the DBus frame header. Other, information is extracted from the packet itself. The parser has to know the following information in order to extract the Layer 4 protocol information from the packet.

Layer 2 encapsulation
Layer 3 protocol
Layer 4 protocol

IP Header Format

Figure 8:
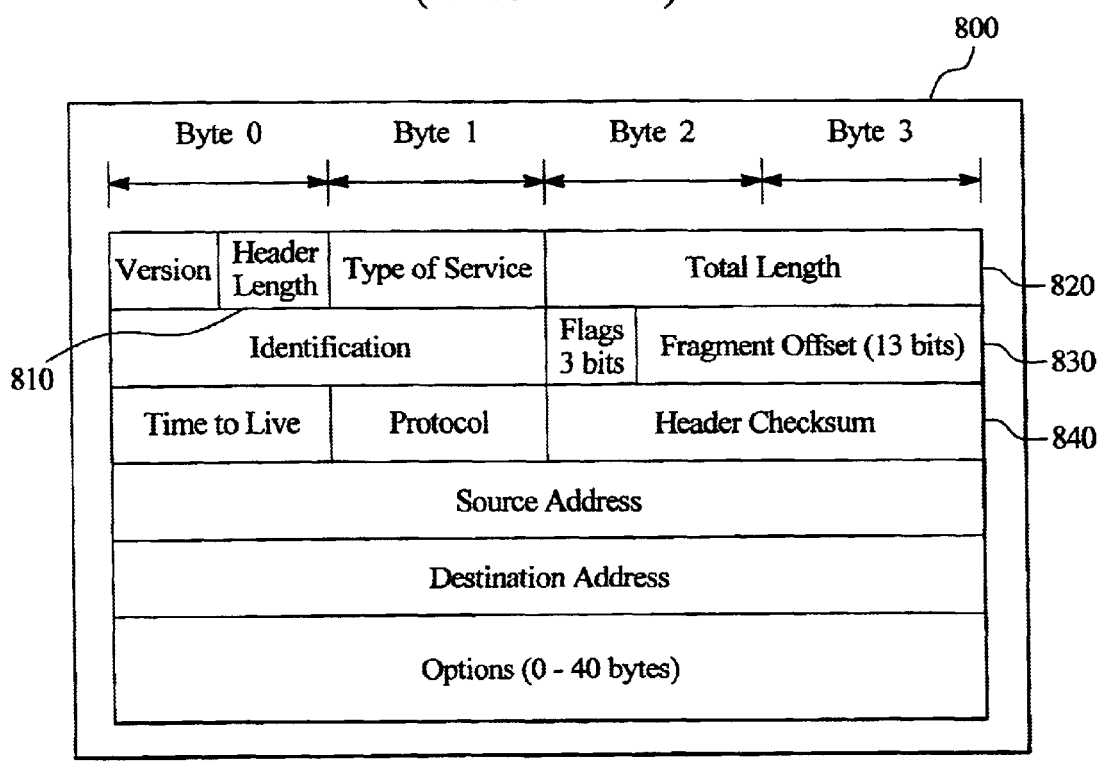
FIG. 8 is a diagram of the prior art IPv4 header bit map.

FIG. 8 shows the format of an IPv4 header 800. The IP header length specifies the length of IP header in 4 byte units. Minimum IPv4 header length is 20 bytes and maximum is 60 bytes. Regardless of the encapsulation type, the IPv4 header always starts within the first 32 bytes after the DBus header.

Extracting Layer 4 Information of IPv4 Packets

The Layer 4 information is needed only for IPv4 packets. An IPX packet does not need Layer 4 information for the ACL lookup. Layer 4 information is as follows:

TCP/UDP source port number
TCP/UDP destination port number
TCP flags

The first two bytes of the TCP/UDP header are the source port number and the third and fourth bytes are the destination port number. The TCP flags are located on the thirteenth byte of the TCP header. Depending on the length of IP header, this information may appear between the second and fourth cycles after the DBus header.

If the protocol number of an IPv4 packet is not TCP or UDP, the source port number and destination port number are forced to a predefined value (0x0 for the Perseus implementation).

The ICMP message type and message code are located in the first and the second byte after the IPv4 header. The IGMP message is located in the first byte after the IP header.

Extracting IPX Information

Figure 9:
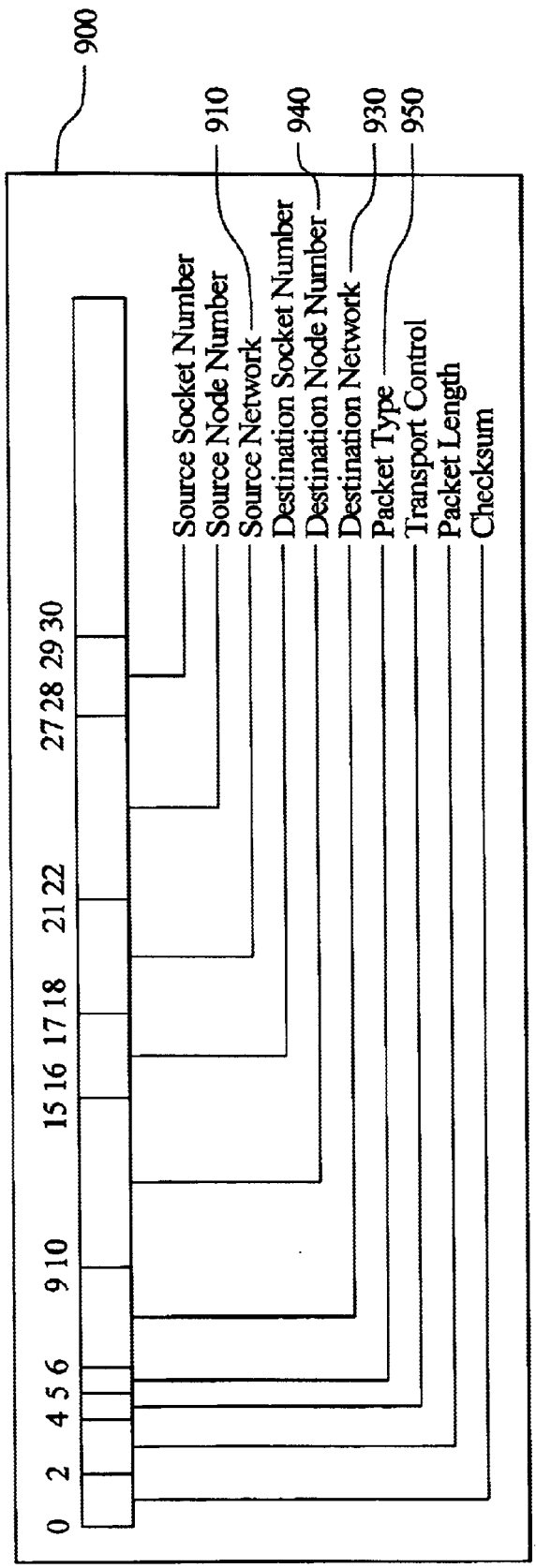
FIG. 9 is a diagram of the prior art IPX packet bit map.

The information of IPX flow labels are extracted from the packet body. FIG. 9 shows the IPX packet format 900. The Source Network 910, Destination Network 930 and Destination Node Number 940 are extracted directly from the packet. The Packet Type 950 is extracted directly from the IPX header.

L4 Mapping Unit (L4MAP)

This block is responsible for mapping an interface number to an ACL label. Once the ACL number is identified, it is assembled as part of the flow label. At the same time, the L4MAP performs logic operations on the L4 source and destination port numbers. The supported logic operations are gt (greater than), lt (less than), ne (not equal) and range. Two levels of tables are used to select a set of logical operation results from the result vector for the given L4 port numbers. The first level table converts the interface number to an ACL label. The second level table selects the L4 port number operations for a given ACL label.

The L4MAP maps the source or destination interface number (as required) into an ACL label. It also takes the L4 source/destination port numbers and performs logical operations against information stored in the LOU registers. The ACL label and selected logical operation results are taken as part of the flow label.

With the exception of type 2 lookup (in the two-track processing alternate embodiment), the remaining three lookup types go through the L4MAP to produce an ACL label and a set of logical operation results. A type 2 lookup gets its ACL label and logical operation results either from its associated type 1 lookup or from its associated type 3 lookup depending how it is programmed. The L4MAP generates two sets of outputs, one for the type 0 lookup and the other for the type 1 lookup, when a packet is received from the DBus. Both sets of outputs are captured in the Label Queue for further processing. The L4MAP outputs a 40-bit result vector for each lookup type. The vector consists of a 9-bit label, a Valid bit, a 3-bit Result, a L4OP Select bit, and a 26-bit L4OP. Everything except for the 26-bit L4OP comes from the Index2Label Mapping Table.

Figure 10:
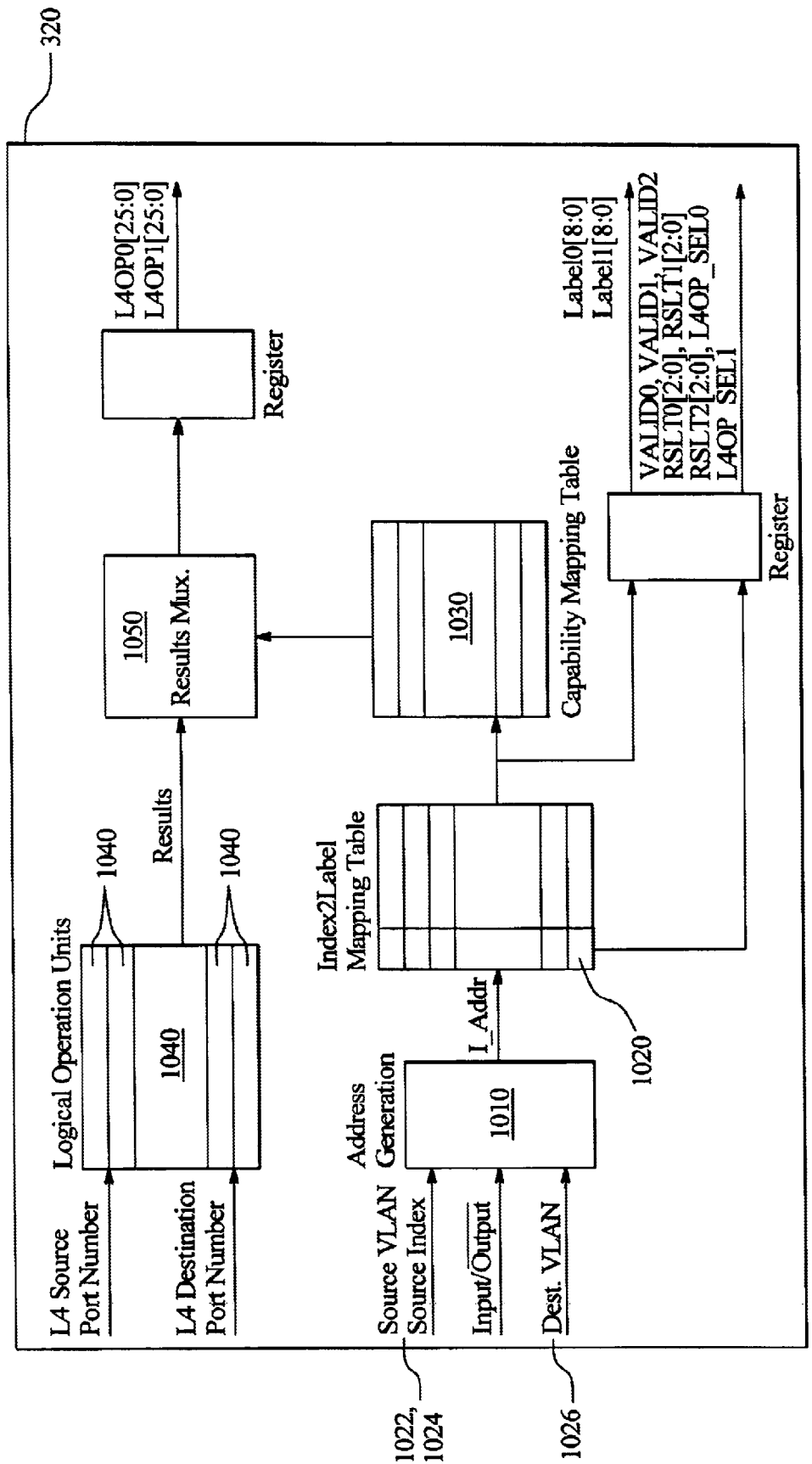
FIG. 10 is a simplified high-level block diagram of L4MAP, according to one embodiment of the present invention.

A block diagram of L4MAP 320 is shown in FIG. 10. The major functional blocks of L4Map are described below.

Address Generation 1010

Depending on the lookup type, the address to the Index2Label Mapping Table 1020 can be sourced from the source virtual LAN address (VLAN) 1022, the source port index (interface number) 1024, or the destination VLAN 1026.

Except for type 2 lookup all other lookup types have to go through the L4MAP to obtain an ACL label and a 26-bit L4 logical operation result. Type 2 lookup uses the same information as type 1 or type 3 lookups. Table 3 lists the sources of address to the Index2Label Mapping Table.

TABLE 3

Source of Address to Index2Label Mapping Table

| Lookup Type | Source of Address |
|---|---|
| Type 0 | Source VLAN |
| Type 1 | Source VLAN or source port index |
| Type 2 (Input) | Same as Type 1. |
| Type 2 (Output) | Same as Type 3 |
| Type 3 | Destination VLAN |

Figure 11:
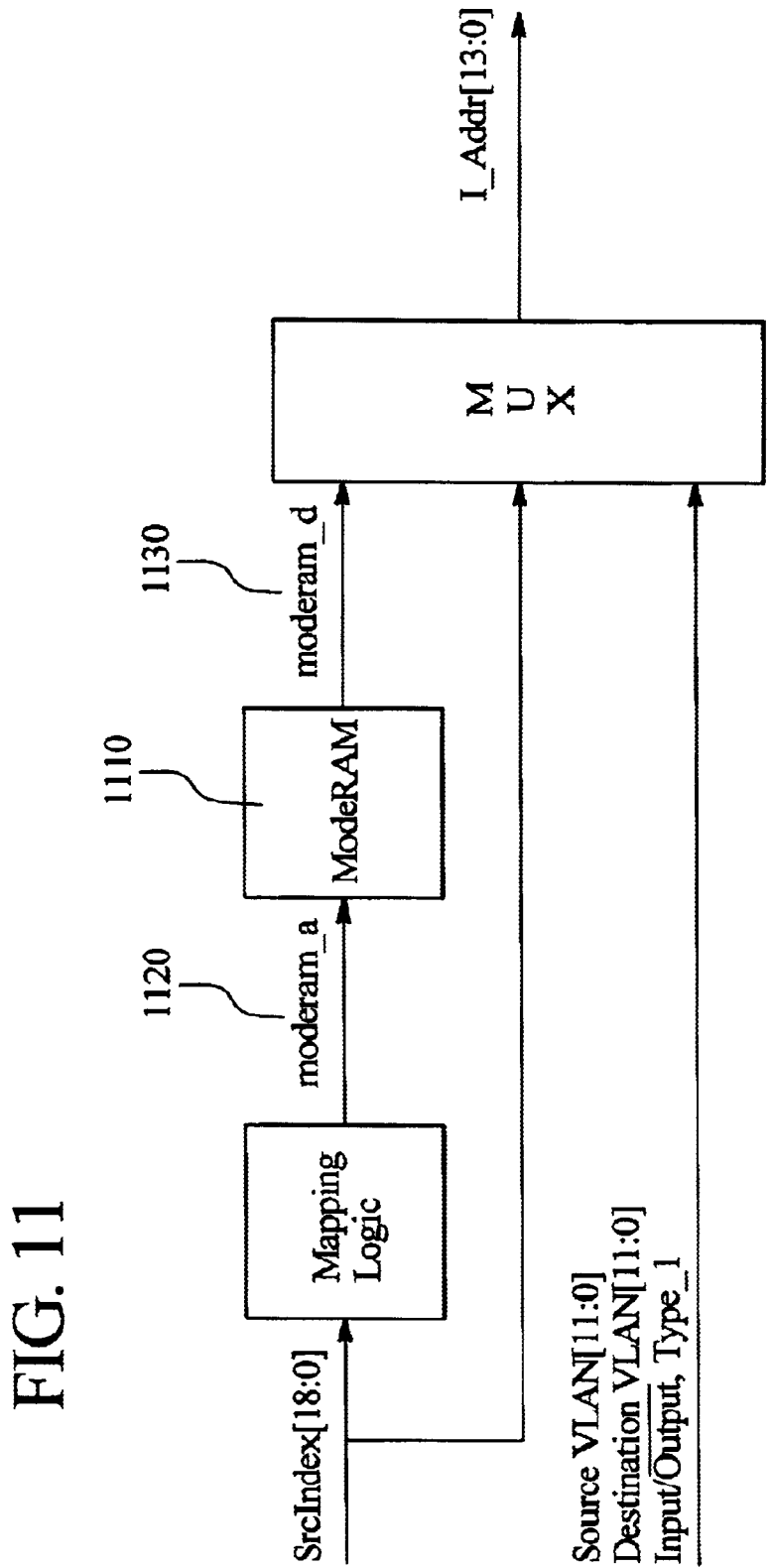
FIG. 11 is a functional block diagram of the address generation function of the Index2Label mapping table, according to one embodiment of the present invention.

FIG. 11 is a block diagram showing how the address to the Index2Label Mapping Table 1020 (FIG. 10) is generated. In this diagram the ModeRAM 1110 is logically used as a 2,064×1 RAM. Physically it is implemented using a 129×16 SRAM.

The following pseudo-code shows how the address to the ModeRAM, moderam_a 1120, is derived:

```
if (SrcIndex[18:15] == 0x0)
    moderam_a = {1'b0, SrcIndex[10:0]}
else
    moderam_a = {1'b1, 7'b0, SrcIndex[18:15]}
```

The following pseudo-code shows how the address of Index2Label Mapping Table 1020 is generated based on the moderam_d 1130, the output VLAN, the source VLAN, the lookup type, and the source index:

```
if (Input/Not Output) == 1) begin            // lookup related to
                          input packet
    if (Type_1 == 0)
        L_Addr = {2'b00, Source VLAN[11:0]}  // use source VLAN
                          for type 0 lookup.
    else begin
        if (moderam_d == 1'b1) begin          // type 1 lookup and
                          mode bit set, use source index
            if (SrcIndex[18:15] == 4'b0)
                L_Addr = {3'b100, SrcIndex[10:0]}
            else
                L_Addr = {3'b101, 7'b0, SrcIndex[18:15]}
            end
        else
            L_Addr = {2'b00, Source VLAN[11:0]}  // type 1 lookup and
                          mode bit clear, use source VLAN
        end
    end
else
    L_Addr = {2'b01, Destination VLAN[11:0]}  // type 3 lookup use
                          destination VLAN
end
```

Mapping Interface Number to ACL Label

The Index2Label Mapping Table 1020 converts a source or destination interface number to an ACL label that identifies the access list associated with the interface. Each entry provides a 9-bit ACL label, an L4OP select control bit, and four lookup result control fields. One lookup result control field is provided for each lookup type. The lookup result control field consists of a "VALID" bit and three result bits, RSLT. If the VALID bit is not set for the lookup type, it implies the lookup type is not needed for the interface. A lookup will still be performed if it is enabled. The lookup results will be provided by the RSLT stored in the same entry instead of from external SRAM.

The L4OP_SEL and the PRTOP_SEL field of the Lookup Control Register decides whether the lookup label contains an L4 source port number or additional L4OP fields. The output from the Index2Label Mapping Table is used as part of the flow label. It is also used as an index to the Capability Mapping Table 1030.

entry. Without additional hardware support, each ACL statement with the gt, lt, ne, or range operator may require multiple CAM entries to achieve an equivalent result. The number of CAM entries can increase dramatically if there are large number of ACL statements using these operators. The majority of the (operator, value) pairs used in a typical ACL are (gt, 1023). To allow more flexibility in mapping the ACL statements to the CAM entries, a set of Logical Operation Units (LOU) 1040 are supported in Perseus. Each LOU 1040 has the following features:

Two value registers for comparison.

Software selects one from the gt, lt, range, and ne operators for each value register.

Each LOU provides one output for the range operator or two outputs for other operators.

Figure 12:
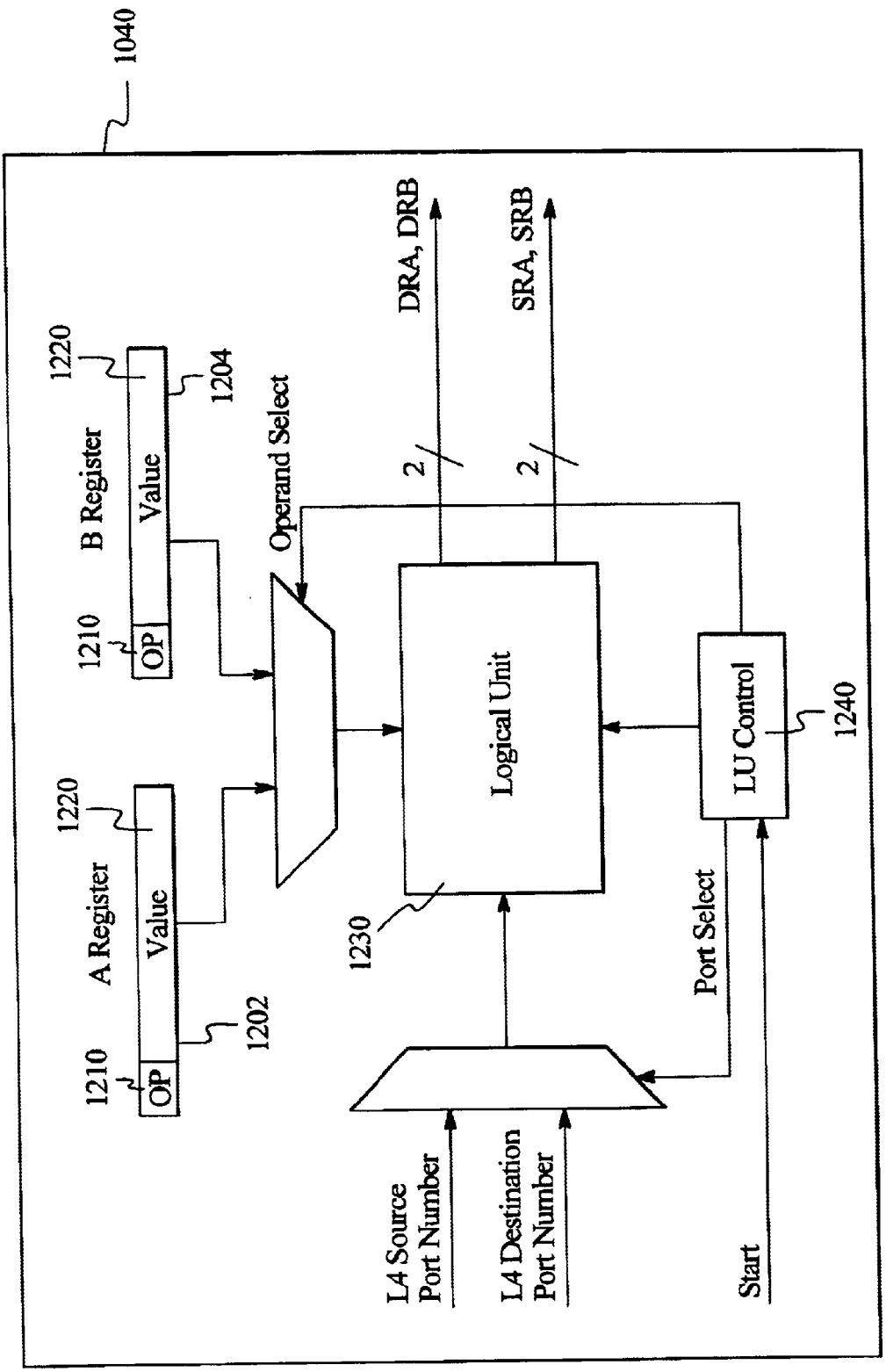
FIG. 12 is a high-level block diagram of the logical operation unit, according to one embodiment of the present invention.

A block diagram of an LOU 1040 is shown in FIG. 12.

Each register 1202, 1204 in LOU 1040 has a 2-bit opcode field 1210 and a 16-bit value field 1220. The opcode specifies which one of the four operators (e.g., gt, lt, ne, or range) is performed between the Layer 4 port numbers and the value field. In case of range operation, the value in the A Register 1202 specifies the high limit and the value in the B Register 1204 specifies the low limit.

Both the input interface lookup and output interface lookup need to use the LOUs. Depending on processing requirements, the Logical Unit 1230 can be time-multiplexed to produce the results in multiple cycles. Perseus multiplexes the results, taking four cycles. Since the Logical Unit 1230 is time multiplexed, the actual hardware is smaller. Alternately, time multiplexing may be omitted, or more or less than four cycles may be needed. The present invention is not limited to any particular form of LOU processing.

The LU Control 1240 sequences through the cycles for each mapping request. Once started it controls the sources of operators and updates the result outputs.

Table 4 shows the sources of operators and the operation performed at each cycle.

TABLE 4

Operands and Operations Select

| Cycle | Operand Select | Port Select | Operation | Results Updated |
|---|---|---|---|---|
| 1 | Value A | Destination | OP_A != 11: (Destination port number) OP_A (Value A) OP_A == 11: (Destination port number) lt (Value A) | DRA |
| 2 | Value B | Destination | OP_B != 11: (Destination port number) OP_B (Value B) OP_B == 11: (Cycle 1 Result) AND ((Destination port number) gt (Value B)) | DRB |
| 3 | Value A | Source | OP_A != 11: (Source port number) OP_A (Value A) OP_A == 11: (Source port number) lt (Value A) | SRA |
| 4 | Value B | Source | OP_B != 11: (Source port number) OP_B (Value B) OP_B == 11: (Cycle 3 Result) AND ((Source port number) gt (Value B)) | SRB |

Logical Operation Units (LOUs) Detailed

The IOS extended access-list command allows the user to specify logic operations on the Layer 4 source port number and destination port number. The logic operations currently supported by IOS are eq (equal), ne (not equal), gt (greater than), lt (less than), and range (inclusive). Among these logic operations, only the "eq" operator is guaranteed to have a one-to-one mapping between an ACL statement and a CAM

AND-OR and OR-AND Units

Figure 13A:
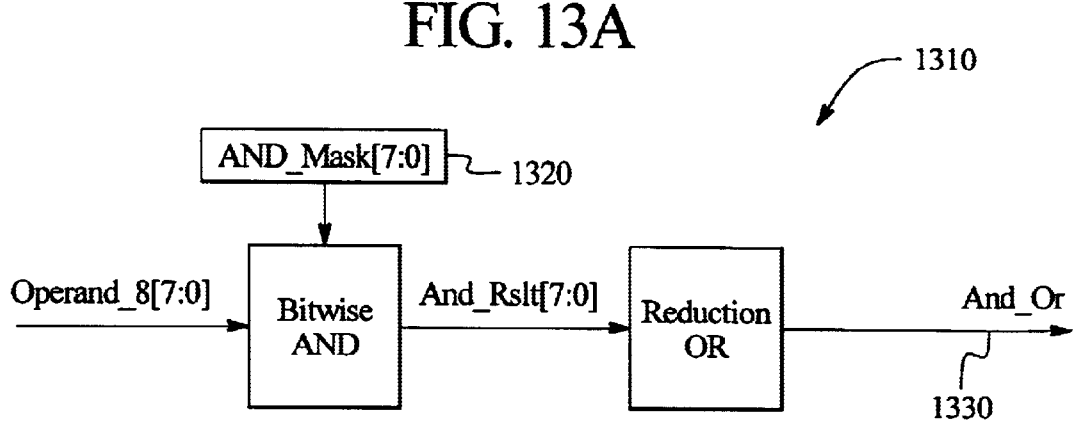
FIG. 13A is a simplified block diagram of the AND-OR unit, according to one embodiment of the present invention.

The AND-OR units 1310 (FIG. 13A) provide a mechanism for looking for one of the multiple bit positions set to "1" in an 8-bit input vector. Perseus supports an array of eight AND-OR units 1310. An AND_Mask register 1320 is provided to each unit to specify the bit positions of interest. The 8-bit input data comes from the byte that contains the TCP flag in the TCP header. The outputs 1330 from the AND-OR array are fed to the Result Multiplexer (Results Mux) 1050 (FIG. 10) for key extraction.

Figure 13B:
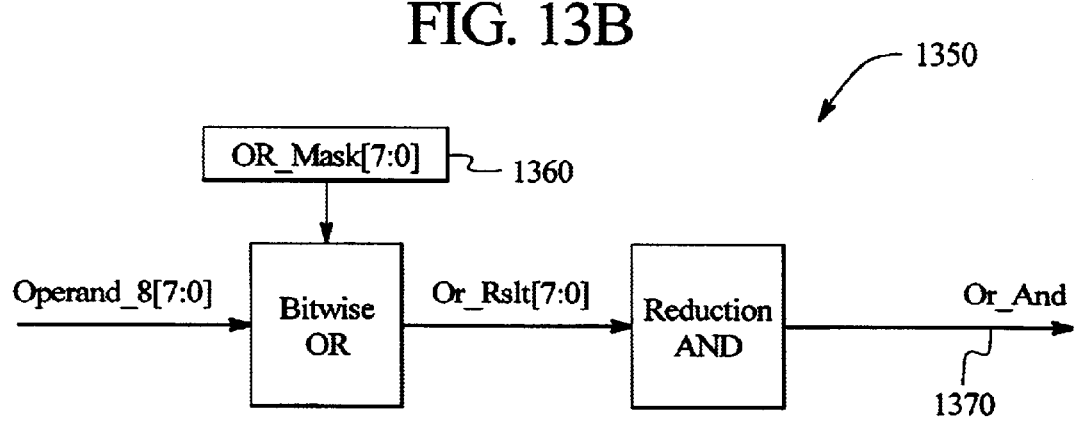
FIG. 13B is a simplified block diagram of the OR-AND unit, according to one embodiment of the present invention.

The OR-AND units 1350 (FIG. 13B) can be used to detect multiple bit positions set to "1" simultaneously in an 8-bit input vector. Perseus supports an array of eight OR-AND units 1350. An OR_Mask register 1360 is provided to each unit to specify the bit positions of interest. The 8-bit input data comes from the byte that contains the TCP flag in the TCP header. The outputs from the OR-AND array 1370 are fed to the Result Mux 1050 for key extraction.

LOU Output Mapping (CAPMAP) and Results Mux

Each ACL label has an associated entry in the Capability Mapping Table 1030, shown in FIG. 10. The entry in the table selects among the logical operations performed on the incoming port numbers. There are 32 LOUs 1040 in Perseus. Each LOU 1040 provides four logical operation results.

An ACL label can select between eight and 26 logical operations, referred to collectively as "L4OPs," from the 144 bits generated from the LOUs, AND-OR, and OR-AND units (128 from the LOUs 1040 and 16 from the AND-OR 1310 and OR-AND 1350 units). Ten of the 26 L4OPs can be randomly selected from the 144 outputs.

LABELQ Unit

Label Queue block 330 (LABELQ) (referring to FIG. 3) serves two main purposes. One is to serve as an elastic buffer for lookup flow labels of the input interfaces, i.e. during an inbound lookup. The other is to store the packet flow information while waiting for the output interface (outbound) lookup request. The Layer 3 FE 370 returns only the outbound interface number. The remaining flow label information for an output interface comes from LABELQ 330. An entry in LABELQ 330 can be retired after all enabled lookup types are serviced. Output from the LABELQ is used by the LPL block 340 for CAM lookups.

Figure 14:
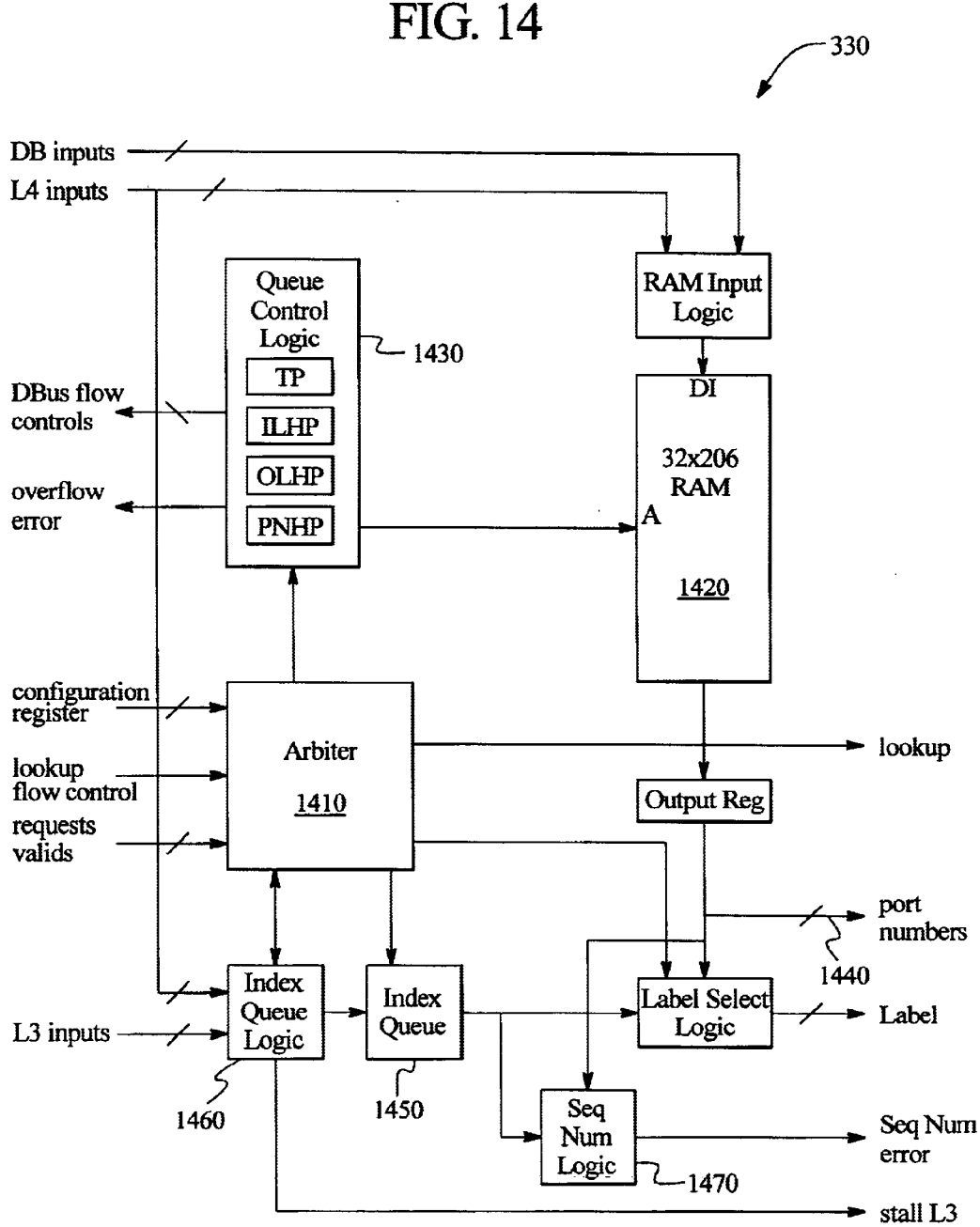
FIG. 14 is a high-level block diagram of LABELQ, according to one embodiment of the present invention.

Label Queue block 330, shown in FIG. 14, serves as a centralized buffer area for various queues. It manages four queues:

input lookup queue output lookup queue

Layer 4 information (port number) queue output index queue

In addition to queue management, Label Queue 330 also arbitrates (via arbiter 1410) up to four lookup requests per frame to the Lookup Pipeline Logic 340. For each output lookup (type 3 or type 2 output mode), the Label Queue performs a sequence number consistency check and signals an error if inconsistency is found.

Input/Output Lookup Queues and Port Number Queue

For each frame received, the Label Queue issues up to four types of lookup requests to the lookup pipeline logic (LPL). Each type of lookup is enabled or disabled by a bit in the Lookup Control Register. The type 0 and type 1 lookups, if enabled, are input lookups and are always issued together and therefore require only a single queue. The type 2 lookup has a mode select in addition to an enable. If enabled and the mode bit is not set (input mode), it follows the other input lookups immediately, and can share the same input lookup queue. In this case three consecutive lookups with the same flow label but different type fields will be issued. The type 3 lookup and the type 2 lookup with the mode bit set (output mode), if enabled, are output lookups and share the same logical queue also, and the lookups are issued one after the other, similar to the type 0 and type 1 lookups.

In addition to the lookup queues, a port number queue is needed to support the layer 4 information read requested by the L4MAP. As output interface numbers are received from the L3FEIF, the L4MAP needs to find out the corresponding L4 port numbers and TCP flags for the frame in order to assemble a lookup key. It initiates a layer 4 information lookup request to the Label Queue to read those port numbers from the stored flow label.

The Label Queue block uses a single physical queue 1420 to implement these three queues as logical queues in queue control logic 1430 by taking advantage of the fact that all frames are processed in the same order. One set of head and tail pointers is used for each queue so that logically there are three overlapping queues. Since flow labels have to be put into all three queues, the tail pointer is shared by all three so that a total of only four pointers are needed:

Tail Pointer (TP)—new flow labels are added to the location pointed to by this pointer.

Input Lookup Head Pointer (ILHP)—type 0/1/2 (input) lookups are dequeued using this pointer.

Output Lookup Head Pointer (OLHP)—type 3/2 (output) lookups are dequeued using this pointer.

Layer 4 Information Head Pointer (PNHP)—Layer 4 information lookups are dequeued using this pointer.

New flow labels from the DBUSIF (for inbound packets) and the L4MAP (for outbound packets) are added to the queues using the Tail Pointer. The flow label is written into the location pointed to by the Tail Pointer, and the Tail Pointer is incremented.

When the Tail Pointer and the Input Lookup Head Pointer together indicate that the input lookup queue is not empty, the logic generates a type 0 and/or type 1 lookup request to arbiter 1410. When the request is granted, the logic reads the flow label from the queue 1420, sends it to the Lookup Pipeline Logic and deletes the flow label from the input lookup queue by incrementing the Input Lookup Head Pointer.

To guarantee that the input lookup for a frame always occur before the output lookup, the Input Lookup Head Pointer is used as the tail pointer for the output lookup queue. When both the output lookup queue and the output index queue are not empty, an output lookup request is generated to the Arbiter. When the request is granted, the logic reads the flow label from the queue, merges it with the data from the Output Index Queue (see below), sends the merged result to the Lookup Pipeline Logic and deletes the flow label from the output lookup queue by incrementing the Output Lookup Head Pointer.

When the logic receives a Layer 4 information read request from the Arbiter, it reads the flow label pointed to by the Layer 4 Information Head Pointer and passes the port numbers 1440 and TCP flags to L4MAP 320 for the port number operations mapping. It increments the Layer 4 Information Head Pointer to remove it from the queue.

The physical queue is implemented as a 32×214 single port RAM 1420. In addition to the information needed to construct a flow label, it stores the 5-bit sequence number and the low order 3 bits of the internal lookup tag.

Output Index Queue

The Output Index Queue 1450 stores the ACL Label, L4OPs, sequence number, and the lookup tags for the type 2 and type 3 lookups. In normal operation the lookup bandwidth is sufficient and no buffering is needed. This queue is provided so that when the CPU (not shown) flushes the lookup pipeline for accesses to the SRAM the output index can be queued.

The queue is implemented as an 8×52 register file. The 52 bits consist of 9 bits of ACL label, 26 bits of L4 operations, 1 bit of source port/L4 operation select, 5 bits of sequence number, the low order 3 bits of lookup tag (which is common for type 2 and type 3 lookups), the upper 4 bits of type 2 lookup tag, and the upper 4 bits of type 3 lookup tag.

When the index queue logic 1460 receives data from L4MAP 320 or when the queue is not empty, it sends an index ready signal to the Arbiter, indicating the output interface is defined. If the output lookup queue is also not empty a request is generated to the Arbiter. When the request is granted, the logic 1460 reads the data from the queue, merges it with the data from the output lookup queue, sends the merged result to the Lookup Pipeline Logic 340 and deletes the entry from the queue. When merging the data, the ACL Label and port operations (L4OPs) from the output lookup queue are selectively replaced by the corresponding fields from the output index queue, depending on the select bits in the Lookup Control Register and the L4 operations/source port select bit stored in the Label Queue 330. The sequence numbers are compared for detecting sequence number error in sequence number logic 1470. The 4-bit tag field from the output lookup queue is replaced by the tag from the output index queue, except when the tag is error, fragment or unsupported packet type, in which case the tag from the output lookup queue will not be replaced.

Arbiter

Arbiter 1410 arbitrates access to the RAM and issues the lookups to Lookup Pipeline 340. There are five operations that require accesses to the RAM:

new labels need to be written to the queue (write)
input lookup: type 0, type 1, or type 2 input mode (read)
output lookup: type 3 or type 2 output mode (read)
Layer 4 information lookup (read)
CPU access (read/write)

Layer 4 information lookup. (discussed above) is given the highest priority to reduce lookup latency. Request are granted immediately so that the output index and the port numbers can enter the L4MAP pipeline with no delay. The output lookup is given the second priority and the new label write request is given the third priority. Since the output lookup can be queued, it is possible to have back to back output lookup requests. The Arbiter will disallow back to back output lookup requests if there is a new label write request pending. Since the Layer 4 information lookup request can arrive every eight clock cycles at the earliest and back to back output lookup is disallowed if there is a write request pending, the new label write request will have to wait at most three clock cycles to be serviced. Since a frame can cross the DBus every eight Perseus internal clock cycles at best, no FIFO is needed from the parser output with the label write at third priority. The input lookup is given the next priority while the CPU access is given the lowest priority.

A maximum of four accesses to the RAM can be required for every frame: new label write, input lookup, Layer 4 information lookup and output lookup. With the DBUSIF and the L3FEIF running at a maximum rate of eight Perseus internal clocks per frame, an one-port RAM has enough bandwidth to support the highest frame rate with extra cycles for CPU accesses.

For sending lookups to the Lookup Pipeline, no arbitration is needed since the priority is implicitly given to the type 3 lookup and/or the type 2 output mode lookup requests (generated in pairs if both enabled) based on the RAM arbitration. The type 0 lookup and the type 1 lookup (if enabled) requests are always generated in pairs also. If the type 2 lookup is enabled and input mode is selected then the type 0 lookup and the type 1 and 2 lookups are always generated as a threesome. Lookups will normally be granted by the Lookup Pipeline Logic on every other clock cycle, except when the CPU tries to access the CAM or the external SRAM. The arbiter stops generating lookup requests if the L3FEIF generates a "stop lookup" signal. The size of the queues are chosen such that when lookup is stopped the queues will not overflow.

Lookup Pipeline Logic (LPL)

The LPL block 340 controls the CAM lookup pipeline. Once a flow label is ready, the LPL starts a pipelined access to the external CAM and SRAM. It also controls CPU access to external CAM and SRAM.

Figure 15:
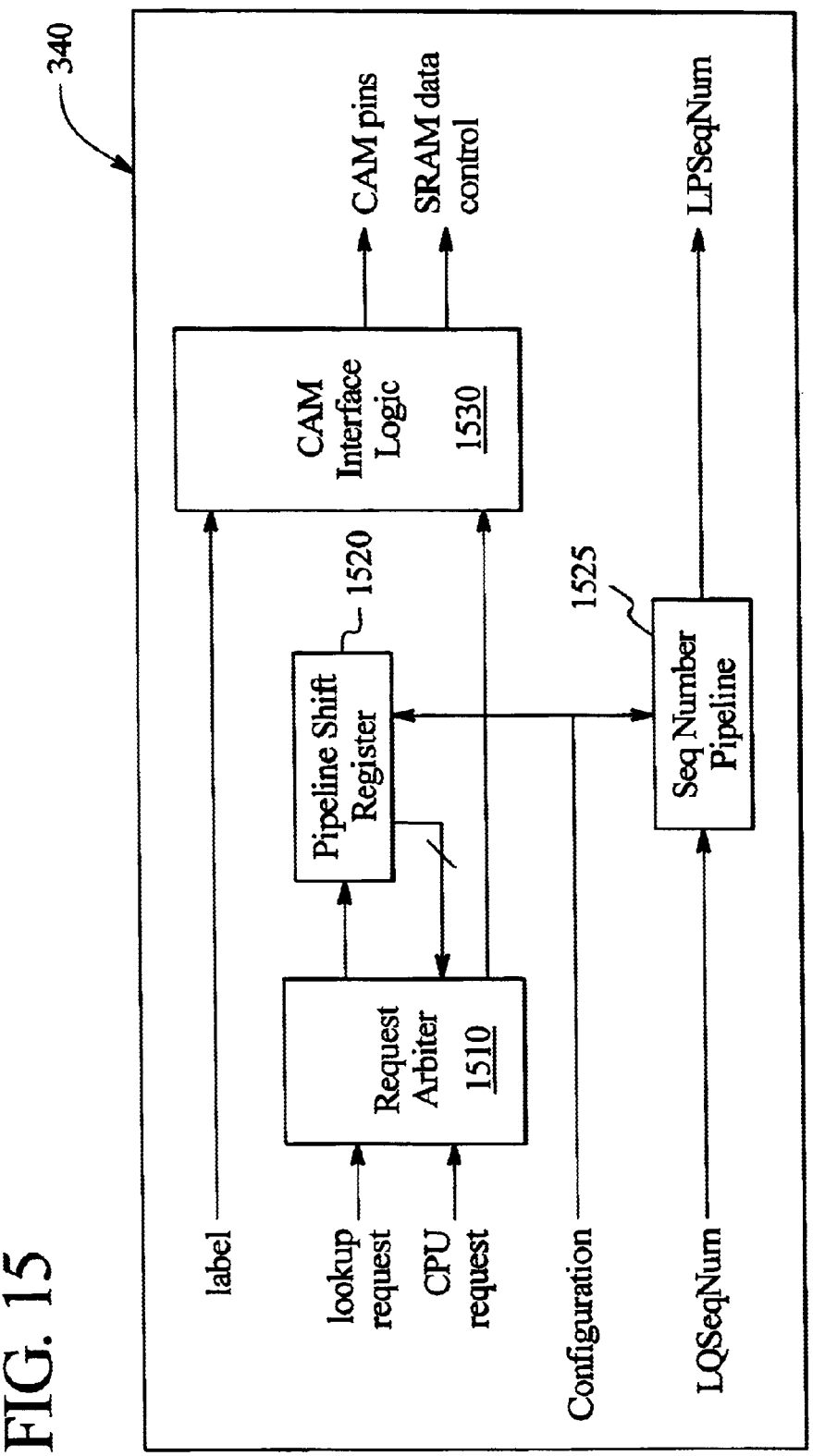
FIG. 15 is a high-level block diagram of the lookup pipeline logic, according to one embodiment of the present invention.

The Lookup Pipeline Logic (LPL), shown in FIG. 15, arbitrates lookup requests from the Label Queue and CPU access requests to the CAM and external SRAM, optimizing the pipeline to maintain maximum lookup bandwidth. It also provides pipeline registers for information such as sequence numbers from the Label Queue so that when lookup results return to the L3FEIF the appropriate reference is supplied along with the results. In addition, it provides the necessary logic to translate CPU access requests to the CAM and external SRAM into CAM commands and also provides a latch for the class bits.

Request Arbiter

The LPL maintains the current status of each stage of the CAM and SRAM pipeline in request arbiter 1510 so that lookup requests or CPU access requests can be inserted into the pipeline with maximum efficiency.

There are three main types of requests:

output lookup requests: type 2 (in output mode) and type 3 lookup requests
input lookup requests: type 0, type 1, and type 2 (in input mode) lookup requests
CPU requests: read or write CAM, read or write SRAM The CAM pipeline runs at half the frequency of Perseus internal clock, so the fastest lookup grant that the LPL can give to the Label Queue is every other clock cycle. Output lookup requests have the highest priority. This reduces the size requirement of the Output Index Queue.

All four types of CPU requests are handled differently. A write CAM request does not require breaking the pipeline. Request arbiter 1510 grants four cycles to the request, two for the address and the other two for the data. Lookup requests can be scheduled immediately before and after the four cycles. A read CAM request can also be granted immediately after a lookup request, but no requests will be granted afterwards until an acknowledge is received from the CAM. An SRAM read or write request requires flushing the pipeline. Upon receiving an SRAM request, request arbiter 1510 checks for the complete pipeline to be empty. It will not grant lookup requests even if one arrives before the pipeline is emptied and the SRAM request started. When the pipeline is finally flushed, it issues the SRAM access request to the CAM. If it is a write request, other requests will be allowed afterwards, but if it is a read request, no requests will be issued until the arbiter receives an acknowledge from the CAM.

Pipeline Control Logic

The LPL keeps track of the pipeline through the CAM and SRAM. It keeps a Valid Lookup Pipeline Shift Register 1520, with each bit representing whether there is a current lookup at that particular stage of the pipeline. The arbiter polls this register to determine whether an SRAM access request can be issued. The output of this pipeline register is also fed to the L3FEIF to indicate the result from the SRAM is valid. In addition to this valid bit, the 5-bit sequence number, the 4-bit tag and the 2-bit type flag from the Label Queue also are pipelined (via sequence number pipeline 1525) and fed to the L3FEIF. The length of the pipeline is programmable through the Lookup Control Register. Software must program the register and the CAM Configuration Register in the CAM chip appropriately so that the pipeline stages of the two chips match.

CAM Interface

Lookup Pipeline Logic 340 interfaces Perseus to CAM 350 via CAM interface logic 1530. This interface includes, in one embodiment of the present invention, a 134 bit data bus.

CAM

CAM 350 stores the flow information for each ACL that can be accelerated by Perseus. After a flow label is presented to the CAM, it:tries to match the contents in the storage to the flow label. If there is a match, an index pointer to the matched entry is provided. If there are multiple matches, the index pointer of the first matched entry is provided.

L3FEIF

Figure 16:
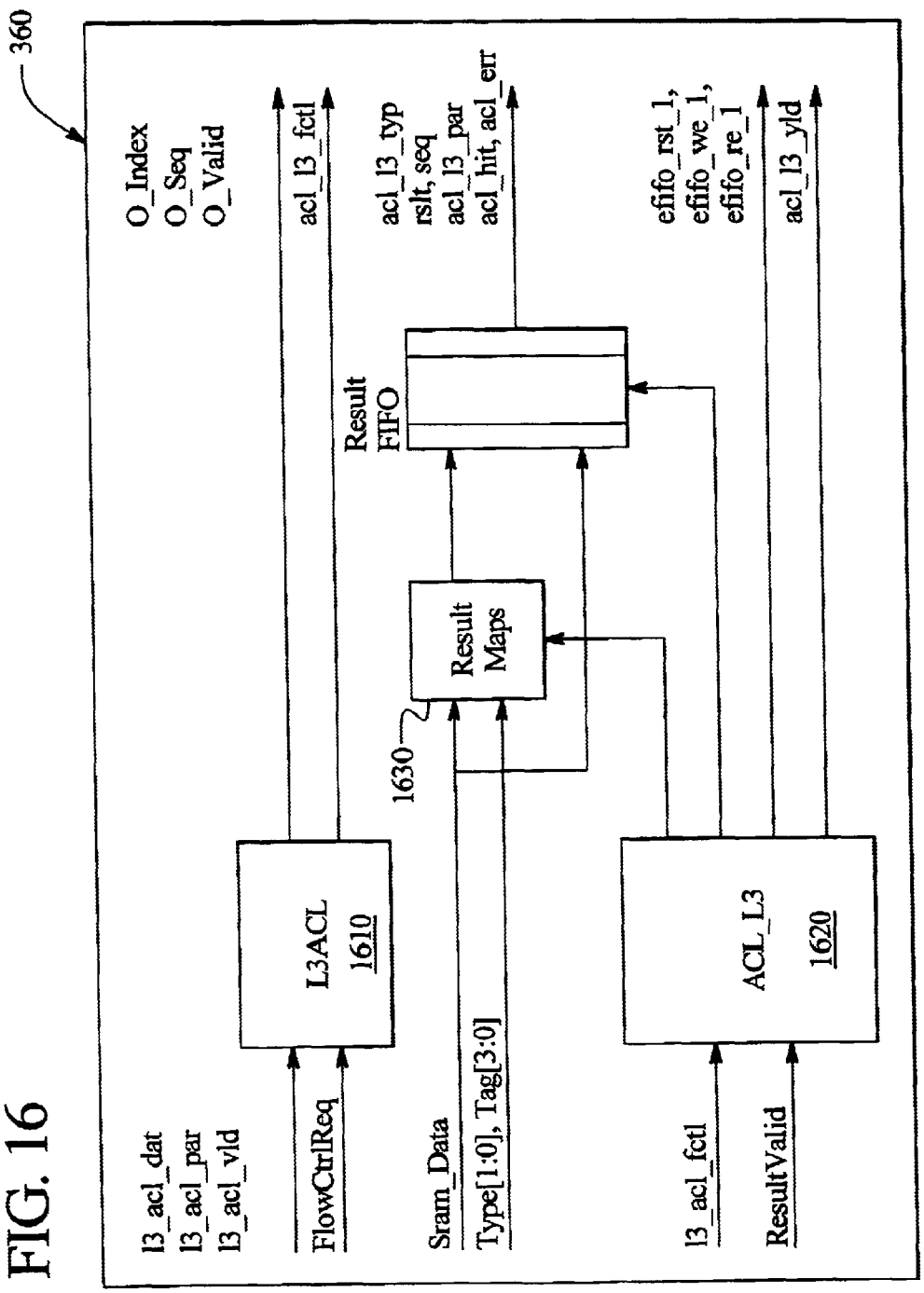
FIG. 16 is a high-level block diagram of the L3 Forwarding Engine interface, according to one embodiment of the present invention.

L3FEIF 360 takes the raw information (e.g. the SRAM data indexed by a match) from the ACL lookup results and presents it to the Layer 3 Forwarding Engine 370. It delivers the lookup results through a dedicated handshake between Perseus and the L3 FE. FIG. 16 is a block diagram of the L3 Forwarding Engine Interface.

The L3 FE also makes an output lookup request through this interface. If type 2 lookup is programmed as an output interface lookup, each L3 FE lookup request can trigger two CAM lookups if both type 2 and type 3 lookups are enabled.

This interface is defined to receive output port interface number for the output interface lookup from, and return ACL lookup results to, L3 Forwarding Engine 370. After a packet is received from the DBus, Perseus starts an input interface lookup(s) for the packet while the L3 Forwarding Engine is deciding how to forward the packet. Either of them can finish its operation earlier than the other. When the input interface lookup is completed, Perseus will try to send the results to the L3 Forwarding Engine immediately, via ACL-L3 interface 1620. The output interface lookup of the same packet may not be started or may be started but not finished. After the input interface and output interface lookups are done, the L3 Forwarding Engine is responsible for combining and interpreting the lookup results.

The SRAM returns 16 bits of raw lookup result to Perseus. The low order 3 bits are processed by Perseus through an internal mapping register 1630. It can also be overwritten based on the status of a packet. A 7-bit code is used to tag a lookup. The tag is propagated through the lookup pipeline. When a lookup result is returned, the associated tag is used to decide whether the result will be overwritten by a predefined value stored in the register. The encoding of tag bits is described in a later section.

Lookup Tag

A 7-bit lookup tag, Tag[6:0], is assigned to a CAM lookup when it is started. The lookup tag consists of two fields and it travels through the lookup pipeline. The first field, Tag [6:3], is provided by the LABELQ when a lookup is started. It could have a different value for each lookup type. Bit 6 of the tag, the VALID bit, indicates whether a lookup is required for the particular lookup type or not. If the VALID bit is set to 0 and the packet has no error, no lookup is required and Tag[5:3], the RSLT bits, provide the lookup result to the L3 Forwarding Engine. It the VALID bit is set to 1, a lookup is required and is processed accordingly.

The second field, Tag[2:0], is used to identify the lookup status, specify the format of the flow label during input lookup, control the update of the flow label during output interface lookup, and control the result overwrite. The encodings of these bits are described in Table 5. For an input interface they are generated based on the status of a DBus packet. For an output interface lookup they are normally provided by the L3 interface except when its corresponding input interface lookup tag has one the following value.

Tag[2:0]=0×0
Tag[2:0]=0×1
Tag[2:0]=0×2
Tag[2:0]=0×3
Tag[2:0]=0×5

If any of the above conditions is true, bits [2:0] of the output interface lookup tag is replaced with its corresponding field of the input interface lookup tag stored in the LABELQ.

TABLE 5

Lookup Tag [2:0] Encoding

| Tag [2:0] | Packet Status |
| --- | --- |
| 0x0 | DBus checksum error |
| 0x1 | IP header checksum error |
| 0x2 | Unsupported packet type |
| 0x3 | Fragment packet |
| 0x4 | Valid lookup |
| 0x5 | Short DBus packet |
| 0x6–0x7 | Reserved |

The error described here is related to a non-fatal error. A non-fatal error can be caused by a DBus checksum error, an IP checksum error, or a short DBus packet error. When a non-fatal error happens, the flow label may not have correct information in it. The result from SRAM does not have any meaning even if the lookup resulted in a hit. When the lookup result is returned, it is overwritten by the ERR field of the Lookup Result Mapping Register. If an input lookup is tagged with an error, the associated output lookup will also be tagged with an error.

Since a fragment packet does not have L4 port number information, the L4 source and destination port numbers and L4OP fields of the flow label are forced to a pre-defined value, 0×0 in one embodiment. During an output interface lookup the L4OP field is replaced with the result from the L4MAP block if the lookup is not tagged with a special code. If the input interface lookup is tagged with a code indicating a fragment packet, the L4OP field will be forced to 0 just like the input interface lookup.

For an unsupported packet the flow label is constructed using different fields from the IPv4 or IPX packet. The field that carries the L4OP for an IPv4 packet now has other information. When constructing a flow label for an output interface lookup, this field should retain its previous value instead of being replaced by the L4OP for the output interface. The lookup tag is assigned with a code for this purpose.

Alternate Embodiments

Dynamic L4OP Computation

One alternate embodiment is to compute L4OPs "on-the-fly," i.e., dynamically, dependent on the particular ACL label associated with the packet. Rather than computing the same predefined, comparatively large set of L4OPs for every packet regardless of the particular access control list associated with each packet, this alternate embodiment uses the ACL label to compute L4OPs directly.

As above, the interface number is mapped to an ACL label (step 530 of FIG. 5). However, in step 560, rather than selecting already existing (pre-computed or pre-defined) L4OPs from the result vector produced by the LOU in step 550, a comparatively smaller and simpler LOU is driven directly by the ACL label, in addition to the L4 port numbers. This small LOU uses the ACL label as a control signal (in the form of a pointer) to execute certain known functions, and only those functions, on the L4 port numbers. The execution of the designated functions is carried out in real time.

The above ACL label pointer is, in one embodiment, a function call to microcode in the LOU. The microcode contains computer instructions (e.g., software or firmware) for carrying out the logical operations appropriate to a given ACL label.

TCAM Instead of CAM

In a further alternate embodiment, CAM 350 may be implemented in a ternary content addressable memory (TCAM) well known in the art. Such devices, exemplified by the NL82711 module manufactured by Netlogic Microsystems, Inc. of Mountain View, Calif., provide for selectable masking of individual bits in each entry. The mask register is used to control which bits in each entry are used in a lookup, and which bits are treated as "don't care" for purposes of the lookup.

As applied to the present invention, a TCAM allows simple lookups to be implemented efficiently. An example using a conventional CAM according to the present invention will illustrate the potential inefficiency of using a conventional CAM. To permit packets from a particular source address, the CAM must contain an entry containing that source address. However, since the L4OP field in the lookup key can take on a number of values depending on the ACL label associated with the packet, a conventional CAM needs to have as many CAM entries containing the desired source address as there are possible L4OP values. This is so that for any value of L4OP, there exists a match to the particular source address.

One method to make such simple lookups (i.e., lookups that do not depend on L4OP values) more efficient is to use the TCAM's masking capabilities to set the L4OP field in some or all of the entries to "don't care." The lookup key is then compared to only those bits or fields in the TCAM entry not masked as "don't care." A given field can thus serve double (or even greater) duty by being used for full width comparisons without masking and for comparisons to subsets of fields with masking.

Conclusion

While particular embodiments of the present invention have been shown and described, it will be apparent to those skilled in the art that changes and modifications may be made without departing from this invention in its broader aspects and, therefore, the appended claims are to encompass within their scope all such changes and modifications as fall within the true spirit and scope of this invention.

We claim:

1. An apparatus for expediting processing in a data communications device comprising:
   an input interface circuit that reads a data packet comprising one or more readable fields;
   a logic circuit connected to said input interface circuit that performs at least one logical function of at least one of said readable fields to create a result vector; and
   a lookup interface circuit connected to said input interface circuit and said logic circuit that extracts from said result vector an auxiliary field and combines said auxiliary field with said readable fields into a lookup key;
   wherein said lookup key is used to perform a content addressable memory lookup.

2. The apparatus according to claim 1 wherein said logical function comprises an input, a plurality of first values, a plurality of second values, a plurality of operators, and a result vector, wherein:
   each of said first values has a corresponding operator and an optional corresponding second value stored as a set in said logic circuit;
   said input is provided by said logic circuit and comprises at least one of said readable fields; and
   said operator in said set is selected from the group consisting of greater than, less than, not equal to, and range;
   said operator "greater than" having a positive result when said input is greater than said first value;
   said operator "less than" having a positive result when said input is less than said first value;
   said operator "not equal to" having a positive result when said input is not equal to said first value; and
   said operator "range" having a positive result when said input is between said first value and said second value;
   wherein a comparison is made substantially simultaneously of said input to said first value and optionally to said second value in each said set according to said corresponding operator; and wherein the results of each said comparison together form a result vector.

3. The apparatus according to claim 1 wherein:
   said logic circuit creates said result vector based at least in part on pre-defined logical functions.

4. The apparatus according to claim 1 wherein said content addressable memory lookup is performed using a ternary content addressable memory.

5. The apparatus according to claim 1 wherein said readable fields comprise a source port number and a destination port number.

6. The apparatus according to claim 1 wherein said data communications device further comprises:
   a mapping circuit connected to said input interface circuit that reads an interface designation from said packet and maps said interface designation to a label;

wherein said lookup interface circuit extracts said auxiliary field using said label.

7. The apparatus according to claim 6 wherein:

said mapping circuit comprises a control signal output derived from said interface designation and connected to said logic circuit; and said logic circuit creates said result vector based at least in part on said control signal.

8. The apparatus according to claim 6 wherein said processing of inbound packets differs from said processing of outbound packets.

9. The apparatus according to claim 8 further comprising:

an input interface circuit that reads one or more readable fields and an interface designator from an inbound data packet.

10. The apparatus according to claim 8 further comprising:

a lookup interface circuit that receives an interface designator from a requesting unit; and retrieves one or more readable fields from a memory.

11. A method of expediting processing comprising the steps of:

reading one or more readable fields from a data packet;

performing at least one logical function of at least one of said readable fields to create a result vector;

extracting from said result vector an auxiliary field;

combining said auxiliary field with said readable fields to create a lookup key; and accessing a content-addressable memory with said lookup key.

12. The method of claim 11 wherein said logical function comprises an input, a plurality of first values, a plurality of second values, a plurality of operators, and a result vector, wherein:

each of said first values has a corresponding operator and an optional corresponding second value stored as a set in a logic circuit;

said input is provided by said logic circuit and comprises at least one of said readable fields; and said operator in said set is selected from the group consisting of greater than, less than, not equal to, and range;

said operator "greater than" having a positive result when said input is greater than said first value;

said operator "less than" having a positive result when said input is less than said first value;

said operator "not equal to" having a positive result when said input is not equal to said first value; and said operator "range" having a positive result when said input is between said first value and said second value;

wherein a comparison is made substantially simultaneously of said input to said first value and optionally to said second value in each said set according to said corresponding operator; and wherein the results of each said comparison together form a result vector.

13. The method of claim 11 wherein:

said logic circuit creates said result vector based at least in part on pre-defined logical functions.

14. The method of claim 11 wherein said content addressable memory is a ternary content addressable memory.

15. The method of claim 11 wherein said readable fields comprise a source port number and a destination port number.

16. The method of claim 11 further comprising:

reading an interface designation from said packet;

mapping said interface designation to a label; and extracting said auxiliary field using said label.

17. The method of claim 16 wherein said mapping comprises deriving a control signal output from said interface designation and wherein said result vector is based at least in part on said control signal.

18. The method of claim 16 wherein said processing of inbound packets differs from said processing of outbound packets.

19. The method of claim 18 further comprising the steps of:

if processing an inbound packet, reading one or more readable fields and an interface designator from said inbound data packet;

but if processing an outbound packet, receiving an interface designator from a requesting unit; and retrieving one or more readable fields from a memory.

20. A computer system for expediting processing comprising computer instructions for:

reading one or more readable fields from a data packet;

performing at least one logical function of at least one of said readable fields to create a result vector;

extracting from said result vector an auxiliary field;

combining said auxiliary field with said readable fields to create a lookup key; and accessing a content-addressable memory with said lookup key.

21. The computer system of claim 20 wherein said logical function comprises an input, a plurality of first values, a plurality of second values, a plurality of operators, and a result vector, wherein:

each of said first values has a corresponding operator and an optional corresponding second value stored as a set in a logic circuit;

said input is provided by said logic circuit and comprises at least one of said readable fields; and said operator in said set is selected from the group consisting of greater than, less than, not equal to, and range;

said operator "greater than" having a positive result when said input is greater than said first value;

said operator "less than" having a positive result when said input is less than said first value;

said operator "not equal to" having a positive result when said input is not equal to said first value; and said operator "range" having a positive result when said input is between said first value and said second value;

wherein a comparison is made substantially simultaneously of said input to said first value and optionally to said second value in each said set according to said corresponding operator; and wherein the results of each said comparison together form a result vector.

22. The computer system of claim 20 wherein:

said logic circuit creates said result vector based at least in part on pre-defined logical functions.

23. The computer system of claim 20 wherein said content addressable memory is a ternary content addressable memory.

24. The computer system of claim 20 wherein said readable fields comprise a source port number and a destination port number.

25. The method of claim 20 further comprising:
reading an interface designation from said packet;
mapping said interface designation to a label; and
extracting said auxiliary field using said label.

26. The method of claim 25 wherein said mapping comprises deriving a control signal output from said interface designation and wherein said result vector is based at least in part on said control signal.

27. The computer system of claim 25 wherein said processing of inbound packets differs from said processing of outbound packets.

28. The computer system of claim 27 further comprising the steps of:
if processing an inbound packet,
reading one or more readable fields and an interface designator from said inbound data packet;
but if processing an outbound packet,
receiving an interface designator from a requesting unit; and
retrieving one or more readable fields from a memory.

29. A computer-readable storage medium comprising computer instructions for:
reading one or more readable fields from a data packet;
performing at least one logical function of at least one of said readable fields to create a result vector;
extracting from said result vector an auxiliary field;
combining said auxiliary field with said readable fields to create a lookup key; and
accessing a content-addressable memory with said lookup key.

30. The computer-readable storage medium of claim 29 wherein said logical function comprises an input, a plurality of first values, a plurality of second values, a plurality of operators, and a result vector, wherein:
each of said first values has a corresponding operator and an optional corresponding second value stored as a set in a logic circuit;
said input is provided by said logic circuit and comprises at least one of said readable fields; and
said operator in said set is selected from the group consisting of greater than, less than, not equal to, and range;
said operator "greater than" having a positive result when said input is greater than said first value;
said operator "less than" having a positive result when said input is less than said first value;
said operator "not equal to" having a positive result when said input is not equal to said first value; and
said operator "range" having a positive result when said input is between said first value and said second value;
wherein a comparison is made substantially simultaneously of said input to said first value and optionally to said second value in each said set according to said corresponding operator; and wherein the results of each said comparison together form a result vector.

31. The computer-readable storage medium of claim 29 wherein:
said logic circuit creates said result vector based at least in part on pre-defined logical functions.

32. The computer-readable storage medium of claim 29 wherein said content addressable memory is a ternary content addressable memory.

33. The computer-readable storage medium of claim 29 wherein said readable fields comprise a source port number and a destination port number.

34. The method of claim 29 further comprising:
reading an interface designation from said packet;
mapping said interface designation to a label; and
extracting said auxiliary field using said label.

35. The method of claim 34 wherein said mapping comprises deriving a control signal output from said interface designation and wherein said result vector is based at least in part on said control signal.

36. The computer-readable storage medium of claim 34 wherein said processing of inbound packets differs from said processing of outbound packets.

37. The computer-readable storage medium of claim 36 further comprising the steps of:
if processing an inbound packet,
reading one or more readable fields and an interface designator from said inbound data packet;
but if processing an outbound packet,
receiving an interface designator from a requesting unit; and
retrieving one or more readable fields from a memory.

* * * * *

UNITED STATES PATENT AND TRADEMARK OFFICE
CERTIFICATE OF CORRECTION

PATENT NO.    : 6,658,002 B1
DATED         : December 2, 2003
INVENTOR(S)   : Ross et al.

It is certified that error appears in the above-identified patent and that said Letters Patent is hereby corrected as shown below:

Column 2,
Line 14, replace "Sivan" with -- Siyan --
Line 36, replace "Guide." with -- Guide, --

Column 3,
Lines 29-30, replace "every entry at the same time." with -- every entry at the same time. --

Column 8,
Line 26, replace "Worldcom;s" with -- Worldcom's --

Column 10,
Line 58, replace "output" with -- output --

Column 11,
Lines 44-46, insert -- • -- before first character on each line (bullet list entries)
Lines 51-54, insert -- • -- before first character on each line (bullet list entries)

Column 14,
Line 11, replace "[3:0]" with -- [31:0] --

Column 15,
Line 7, replace "Other," with -- Other --
Lines 11-13, insert -- • -- before first character on each line (bullet list entries)
Lines 28-30, insert -- • -- before first character on each line (bullet list entries)
Line 60, replace "It" with -- lt --

Column 18,
Lines 13, 14 and 16, insert -- • -- before first character on each line (bullet list entries)

Column 19,
Lines 43-46, insert -- • -- before first character on each line (bullet list entries)

Column 20,
Lines 21, 23, 25 and 27, insert -- • -- before first character on each line (bullet list entries)

UNITED STATES PATENT AND TRADEMARK OFFICE
CERTIFICATE OF CORRECTION

PATENT NO.    : 6,658,002 B1
DATED         : December 2, 2003
INVENTOR(S)   : Ross et al.

It is certified that error appears in the above-identified patent and that said Letters Patent is hereby corrected as shown below:

Column 21,
Lines 37-41, insert -- • -- before first character on each line (bullet list entries)
Line 42, replace "lookup." with -- lookup --

Column 22,
Lines 42, 44 and 46, insert -- • -- before first character on each line (bullet list entries)

Column 23,
Line 31, replace "it:tries" with -- it tries --

Column 24,
Lines 27-31, insert -- • -- before first character on each line (bullet list entries)

Signed and Sealed this

Twenty-eighth Day of December, 2004

JON W. DUDAS
*Director of the United States Patent and Trademark Office*